United States Patent
Watanabe et al.

(10) Patent No.: US 10,609,455 B2
(45) Date of Patent: Mar. 31, 2020

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku, Tokyo (JP)

(72) Inventors: Nayuko Watanabe, Kawasaki Kanagawa (JP); Kosei Fume, Kawasaki Kanagawa (JP); Hiroshi Fujimura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

(21) Appl. No.: 15/683,543

(22) Filed: Aug. 22, 2017

(65) Prior Publication Data
US 2018/0279010 A1  Sep. 27, 2018

(30) Foreign Application Priority Data
Mar. 21, 2017  (JP) ................ 2017-054430

(51) Int. Cl.
| | |
|---|---|
| G10L 15/00 | (2013.01) |
| H04N 21/488 | (2011.01) |
| G10L 15/26 | (2006.01) |
| G06F 17/24 | (2006.01) |
| G10L 21/10 | (2013.01) |
| G10L 15/22 | (2006.01) |
| G10L 15/19 | (2013.01) |
| G10L 15/187 | (2013.01) |

(52) U.S. Cl.
CPC ......... *H04N 21/4884* (2013.01); *G06F 17/24* (2013.01); *G10L 15/22* (2013.01); *G10L 15/26* (2013.01); *G10L 21/10* (2013.01); *G10L 15/187* (2013.01); *G10L 15/19* (2013.01)

(58) Field of Classification Search
CPC combination set(s) only.
See application file for complete search history.

(56) References Cited

U.S. PATENT DOCUMENTS

| | | |
|---|---|---|
| 5,151,940 A | 9/1992 | Okazaki et al. |
| 7,356,467 B2 | 4/2008 | Kemp |
| 7,412,383 B1 | 8/2008 | Alonso et al. |

(Continued)

FOREIGN PATENT DOCUMENTS

| | | |
|---|---|---|
| JP | 2000-029492 A | 1/2000 |
| JP | 2002-287792 A | 10/2002 |

(Continued)

OTHER PUBLICATIONS

Nagatsuma, R., et al., "Effective Captioning Method by Using Crowd-Sourcing Approach", IEICE Technical Report, WIT2012-25 (Dec. 2012), 17 pgs. Copyright 2012.

*Primary Examiner* — Vu B Hang
(74) *Attorney, Agent, or Firm* — Knobbe, Martens, Olson & Bear, LLP

(57) ABSTRACT

According to an embodiment, an information processing apparatus includes one or more processors. The one or more processors are configured to acquire target sentence data including a plurality of morphemes obtained by speech recognition and speech generation time of each morpheme from the plurality of morphemes; and assign display time according to a difference between a confirmed sentence of which a user's correction for the target sentence data is confirmed and a second confirmed sentence of a previous speech generation time.

15 Claims, 21 Drawing Sheets

(56) References Cited

U.S. PATENT DOCUMENTS

| | | |
|---|---|---|
| 7,444,286 B2 | 10/2008 | Roth et al. |
| 7,983,912 B2 | 7/2011 | Hirakawa et al. |
| 8,311,832 B2 | 11/2012 | Miyamoto et al. |
| 8,756,057 B2 | 6/2014 | Miller et al. |
| 9,099,089 B2 | 8/2015 | Dzik et al. |
| 9,159,319 B1 | 10/2015 | Hoffmeister |
| 2011/0208507 A1 | 8/2011 | Hughes |
| 2012/0072210 A1 | 3/2012 | Suzuki et al. |
| 2014/0012580 A1 | 1/2014 | Ganong, III et al. |
| 2015/0149163 A1 | 5/2015 | VanBlon et al. |
| 2017/0270086 A1 | 9/2017 | Fume et al. |
| 2018/0075839 A1 | 3/2018 | Fume et al. |

FOREIGN PATENT DOCUMENTS

| | | |
|---|---|---|
| JP | 2004-151614 A | 5/2004 |
| JP | 2004-207821 A | 7/2004 |
| JP | 2004-334133 A | 11/2004 |
| JP | 2006-211636 A | 8/2006 |
| JP | 2006-228131 | 8/2006 |
| JP | 2007-093789 A | 4/2007 |
| JP | 2008-051895 A | 3/2008 |
| JP | 2008-210500 A | 9/2008 |
| JP | 2009-187349 | 8/2009 |
| JP | 2011-002656 | 1/2011 |
| JP | 2011-238047 | 11/2011 |
| JP | 2015-056154 A | 3/2015 |
| JP | 2015-531915 A | 11/2015 |
| JP | 2017-167368 A | 9/2017 |
| JP | 2018-044993 | 3/2018 |

| TRANSCRIPTION | Thank | you | share, |
|---|---|---|---|
| START TIME | 0 | 425 | 758 |
| END TIME | 398 | 671 | 1202 |
| DIVISION SCORE | 54 | 174 | 639 |

32B (32)

| TRANSCRIPTION | today, | I | peak | to | you | about | Speech Rocognition. |
|---|---|---|---|---|---|---|---|
| START TIME | 1520 | 1873 | 2015 | 2446 | 2682 | 3052 | 3790 |
| END TIME | 1714 | 1909 | 2301 | 2581 | 2827 | 3510 | 4815 |
| DIVISION SCORE | 321 | 212 | 290 | 202 | 450 | 560 | 2081 |

32C (32)

| TRANSCRIPTION | This | is | two | days | agenda, |
|---|---|---|---|---|---|
| START TIME | 5821 | 6091 | 6275 | 6398 | 7015 |
| END TIME | 6018 | 6105 | 6381 | 6810 | 7452 |
| DIVISION SCORE | 146 | 340 | 34 | 410 | 1485 |

32D (32)

| TRANSCRIPTION | first, | I'll | saw | you | the | back | ... |
|---|---|---|---|---|---|---|---|
| START TIME | 8193 | 9258 | 9410 | 9847 | 10028 | 10264 | ... |
| END TIME | 9142 | 9372 | 9751 | 9920 | 10104 | 10417 | ... |
| DIVISION SCORE | 235 | 76 | 192 | 216 | 320 | 106 | ... |

| CORRECTION OPERATION | STROKE |
|---|---|
| DELETION | ─ , \ |
| INSERTION | ∧ , ∨ |
| SUBSTITUTION | ⌐ |
| CONFIRMATION | ⌐ |

ORIGINAL CORRECTION SEGMENT — 32E (32, 30)

| TRANSCRIP-TION | well, | you | no | I | have | beans | Japan |
|---|---|---|---|---|---|---|---|
| START TIME | 0 | 203 | 430 | 512 | 646 | 686 | 760 |
| END TIME | 199 | 417 | 501 | 640 | 683 | 716 | 812 |

— 34E (34, 30)

| TRANSCRIP-TION | you | know, | I | have | been | to | Japan |
|---|---|---|---|---|---|---|---|
| START TIME | 203 | 430 | 512 | 646 | 686 | 716 | 760 |
| END TIME | 417 | 501 | 640 | 683 | 716 | 760 | 812 |

FIG.8A

| TRANSCRIPTION | Thank | you | chair, | 34A (34) |
|---|---|---|---|---|
| START TIME | 0 | 425 | 758 | |
| END TIME | 398 | 671 | 1202 | |
| DISPLAY TIME | 0 | | | |

FIG.8B

| TRANSCRIPTION | today, | I | speak | to | you | about | Speech Rocognition. | 34B (34) |
|---|---|---|---|---|---|---|---|---|
| START TIME | 1520 | 1873 | 2015 | 2446 | 2682 | 3052 | 3790 | |
| END TIME | 1714 | 1909 | 2301 | 2581 | 2827 | 3510 | 4815 | |
| DISPLAY TIME | 760 (=(1520−0)×0.5) | | | | | | | |

FIG.23A

| TRANSCRIP-TION | Thank | you | share, |
|---|---|---|---|
| START TIME | 0 | 425 | 758 |
| END TIME | 398 | 671 | 1202 |
| CERTAINTY FACTOR | 0.8 | 0.8 | 0.5 |
| CORRECTION LIMIT TIME | | | 986.4 |

FIG.23B

| TRANSCRIP-TION | today, | I | peak | to | you | about | Speech Rocognition. |
|---|---|---|---|---|---|---|---|
| START TIME | 1520 | 1873 | 2015 | 2446 | 2682 | 3052 | 3790 |
| END TIME | 1714 | 1909 | 2301 | 2581 | 2827 | 3510 | 4815 |
| CERTAINTY FACTOR | 0.9 | 0.8 | 0.7 | 0.6 | 0.7 | 0.6 | 0.8 |
| CORRECTION LIMIT TIME | | | | | | | 3894.3 |

INFORMATION PROCESSING APPARATUS, INFORMATION PROCESSING METHOD, AND COMPUTER PROGRAM PRODUCT

CROSS-REFERENCE TO RELATED APPLICATION

This application is based upon and claims the benefit of priority from Japanese Patent Application No. 2017-054430, filed on Mar. 21, 2017; the entire contents of which are incorporated herein by reference.

FIELD

Embodiments described herein relate generally to an information processing apparatus, an information processing method, and a computer program product.

BACKGROUND

Technologies for performing subtitle display of a text acquired by speech recognition are known. In addition, technologies for correcting erroneous recognition of speech are known. For example, a result of speech recognition is divided into segments, and user's correction is received for each segment. A system that, every time when a user's correction for each segment is confirmed, sequentially performs subtitle display of the result of speech recognition in segments after the correction at the time of the confirmation is disclosed.

However, conventionally, at time when a correction in the segment is confirmed, subtitles in segments after the correction are sequentially displayed. For this reason, there are cases where a subtitle corresponding to a segment that is generated as speech at the next time is displayed in the middle of or before a user's recognition of the subtitle. In addition, there are cases where it is difficult for a user to read a subtitle.

BRIEF DESCRIPTION OF THE DRAWINGS

FIG. 3 is a schematic diagram of the data configuration of target sentence data;
FIG. 4 is a schematic diagram that illustrates a correspondence between a kind of correction operation and a form of a stroke;
FIGS. 8A and 8B are explanatory diagrams that illustrate assignment of display time;
FIGS. 23A and 23B are schematic diagrams of the data configuration of target sentence data.

DETAILED DESCRIPTION

According to an embodiment, an information processing apparatus includes one or more processors. The one or more hardware processors are configured to acquire target sentence data comprising a plurality of morphemes obtained by speech recognition and a speech generation time of each morpheme from the plurality of morphemes; and assign a display time according to a difference between a confirmed sentence of which a user's correction for the target sentence data is confirmed and a second confirmed sentence of a previous speech generation time.

Hereinafter, an information processing apparatus, an information processing method, and an information processing program will be described in detail with reference to the attached drawings.

First Embodiment

Figure 1:
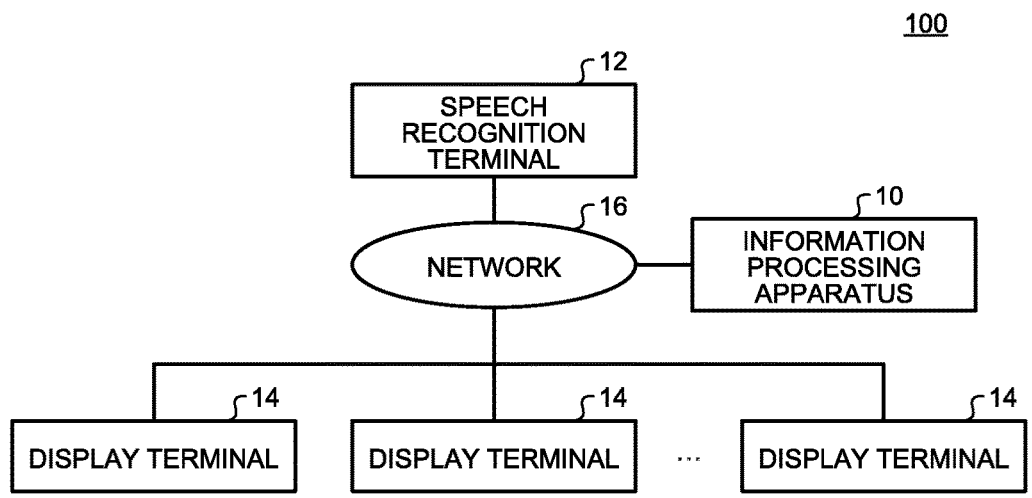
FIG. 1 is a schematic diagram of an information processing system.

FIG. 1 is a schematic diagram of an example of an information processing system 100. The information processing system 100 includes a speech recognition terminal 12, an information processing apparatus 10, and a display terminal 14. The speech recognition terminal 12, the information processing apparatus 10, and the display terminal 14 are interconnected through a network 16.

The network 16 is a known communication network. The network 16, for example, is the Internet, a mobile phone network, or the like. The network 16, for example, is realized by a cable, a transceiver, a router, a switch, a wireless LAN access point, a wireless LAN transmitter/receiver, or the like.

The speech recognition terminal 12 recognizes output speech and outputs target sentence data (to be described later in detail). The speech recognition terminal 12 includes a microphone that receives speech and a known speech recognition function. The speech recognition terminal 12, for example, is a personal computer, a tablet terminal, or the like.

The information processing apparatus 10 is used for correcting a text included in target sentence data recognized by the speech recognition terminal 12. The information processing apparatus 10 includes an input function for receiving an operation direction from a user and a display function for displaying an image. While the information processing apparatus 10 will be described to have a configuration including a touch panel that includes an input function and a display function altogether, the configuration is not limited thereto. The information processing apparatus 10, for example, is a personal computer, a tablet terminal, or the like.

The display terminal 14 is a terminal used for displaying a subtitle. The display terminal 14 includes at least a display function for displaying a subtitle. The display terminal 14, for example, is a personal computer, a tablet terminal, or the like.

In the information processing system 100 according to this embodiment, the speech recognition terminal 12 recognizes speech and outputs target sentence data including recognized text data to the information processing apparatus 10. The information processing apparatus 10 corrects the target sentence data and outputs the corrected target sentence data to the display terminal 14. The display terminal 14 displays the text data received from the information processing apparatus 10 as a subtitle.

FIG. 1 illustrates a case where the information processing system 100 has a configuration that includes one speech recognition terminal 12, one information processing apparatus 10, and a plurality of display terminals 14 as an example. However, the number of speech recognition terminals 12 and the number of information processing apparatuses 10 disposed in the information processing system 100 are not limited to one. Similarly, the number of display terminals 14 disposed in the information processing system 100 is not limited.

Figure 2:
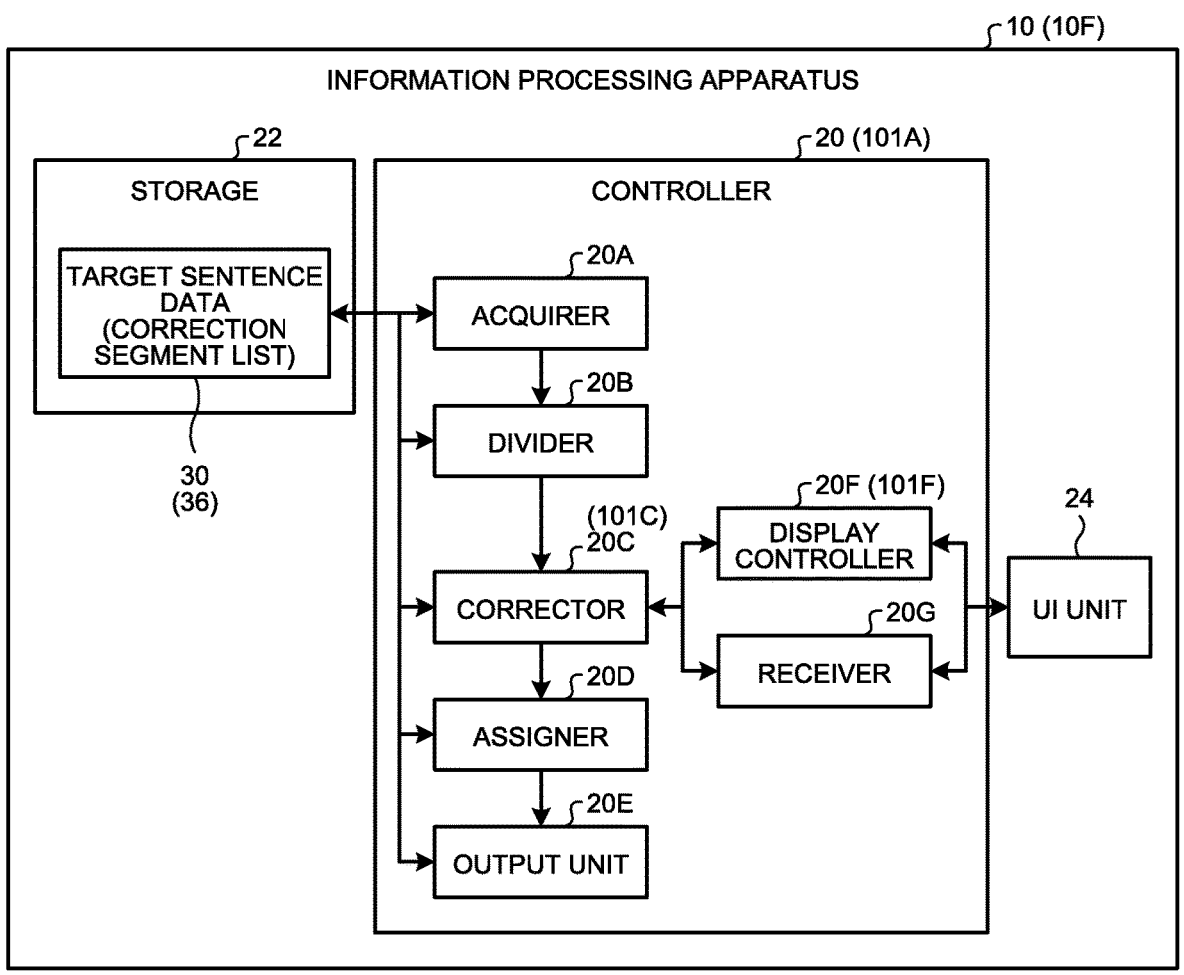
FIG. 2 is a functional block diagram of an information processing apparatus.

Next, the functional configuration of the information processing apparatus 10 will be described. FIG. 2 is an example of a functional block diagram of the information processing apparatus 10.

The information processing apparatus 10 includes a controller 20, a storage 22, and a UI unit 24. The storage 22 and the UI unit 24 are connected to the controller 20 so as to transmit/receive data and signals to/from the controller 20.

The UI unit 24 has an input function for receiving an operation direction from a user and a display function for displaying an image. The input function, for example, is realized by a keyboard, a mouse, or the like. The display function, for example, is realized by a liquid crystal display device, an organic electroluminescence (EL) display, or the like. In this embodiment, while a case where the UI unit 24 is a touch panel having the input function and the display function altogether will be described as an example, the UI unit 24 is not limited thereto.

The storage 22 stores various kinds of information. In this embodiment, the storage 22 stores target sentence data 30. The storage 22 is a known storage medium such as a hard disk drive (HDD). The storage 22 may be disposed in an external apparatus connected through the network 16.

FIG. 3 is a schematic diagram that illustrates an example of the data configuration of the target sentence data 30. The target sentence data 30 includes text data acquired by the speech recognition terminal 12 through speech recognition and speech generation time. In more details, the target sentence data 30 includes morphemes and speech generation time corresponding to each morpheme.

The text data includes a plurality of morphemes. In this embodiment, a morpheme includes one or a plurality of minimal language units each having a meaning and is configured by one or more phonemes. In addition, the text data may further include information representing reading of each morpheme and the like. A correction is mainly performed in units of words or phrases, and thus, hereinafter, in a case where a "morpheme" is represented, it mainly represents a word, a phrase, or the like.

The speech generation time represents time when speech of each morpheme is generated. In this embodiment, the speech generation time is represented as speech generation start time at which speech of each morpheme is generated and speech generation end time. Hereinafter, the speech generation start time will be simply referred to as start time in description. Similarly, hereinafter, the speech generation end time will be simply referred to as end time in the description.

The speech generation time of a morpheme is not limited to the form represented by start time and end time. The speech generation time of a morpheme may be represented in a form that can be converted into time on the information processing apparatus 10 side. For example, the speech generation time of a morpheme may be the number of seconds, a count number representing the number of times of speech recognition, or the like. In addition, it may be configured such that, only for a first morpheme of the target sentence data 30, start time is maintained as speech generation time, and, for the other morphemes, information representing an elapsed time (relative time) from the first morpheme is maintained as speech generation time.

The information processing apparatus 10 stores the target sentence data 30 acquired from the speech recognition terminal 12 in the storage 22 as a correction segment list 36. The controller 20 performs a process to be described later for the target sentence data 30 registered in the correction segment list 36.

FIG. 3 illustrates division scores. A division score is assigned to each morpheme by the process of the controller 20 to be described later. For this reason, a division score is not assigned to the target sentence data 30 acquired from the speech recognition terminal 12.

The controller 20 controls the overall operation of the information processing apparatus 10. The controller 20 includes units: an acquirer 20A, a divider 20B, a corrector 20C, an assigner 20D, an output unit 20E, a display controller 20F, and a receiver 20G.

The units described above is realized by one or more processors. For example, each of the units described above may be realized by causing a processor such as a central processing unit (CPU) to execute a program, in other words, software. The units described above may be realized by a processor such as a dedicated integrated circuit (IC), in other words, hardware. The units described above may be realized by using software and hardware altogether. In a case where a plurality of processors are used, each of the processors may realize one of the units or two or more of the units.

The acquirer 20A acquires the target sentence data 30. In other words, the acquirer 20A acquires the target sentence data 30 comprising a plurality of morphemes acquired through speech recognition and a speech generation time of each morpheme from the plurality of morphemes.

For example, the acquirer 20A acquires target sentence data 30 illustrated in FIG. 3. However, the data description format of the target sentence data 30 is not limited. For example, the acquirer 20A acquires target sentence data 30 described in a JavaScript (registered trademark) Object Notation (JSON) format from the speech recognition terminal 12. In addition, the data description format of the target sentence data 30 is not limited thereto but may be an XML, a binary representation, an independent description format, or the like.

While FIG. 3 illustrates a case where the target sentence data is represented in English as an example, the notation is not limited to English.

The description will be continued by referring back to FIG. 2. The divider 20B divides the target sentence data 30 into correction segments. A correction segment is a unit that can be corrected by a user.

Here, there are cases where a morpheme that is incorrectly recognized by the speech recognition terminal 12 is included in text data configured by a group (morpheme string) of morphemes included in the target sentence data 30. For example, a user searches for an erroneous portion and corrects the erroneous portion while performing matching between a morpheme included in the text data and speech. For this reason, as the length of the correction segment is increased, user's search load increases, and a time required for the correction increases.

Thus, the divider 20B, as illustrated in FIG. 3, divides the target sentence data 30 into a plurality of correction segments 32. FIG. 3 illustrates an example in which target sentence data 30 is divided into a plurality of correction segments 32 (a correction segment 32A, a correction segment 32B, a correction segment 32C, and a correction segment 32D).

For example, the divider 20B divides text data included in the target sentence data 30 into a plurality of correction segments 32 at positions that are near a time length $T^S$ set in advance and positions of morphemes that are pauses between sentences. Here, the positions of morphemes that are near the time length $T^S$ and positions of pauses between sentences are division positions of the text data. The time length $T^S$ may be set in advance.

In more details, the divider 20B calculates a division score $S^S$ for each morpheme configuring the text data. The division score $S^S$ is a value that represents the degree of easiness in breaking between a corresponding morpheme and a morpheme of next speech generation time in time.

First, the divider 20B calculates a division score by using Equation (1) for each of the morphemes included in the target sentence data 30.

$$S_i = \alpha \times (t_{i+1}^b - t_i^e) + \beta \times p_i \quad (1)$$

In Equation (1), $S_i$ represents the division score of an i-th morpheme. The "i-th" represents the position of a morpheme with the first position in the target sentence data 30 set as the first. In Equation (1), α and β are coefficients set in advance. In addition, in Equation (1), $t_{i+1}^b$ represents the start time of the (i+1)-th morpheme, and $t_i^e$ represents the end time of the i-th morpheme. In Equation (1), $p_i$ represents a punctuation mark score. The punctuation mark score is represented in the following Equation (2).

$$p_i = \begin{cases} 2 & \text{if } w_i \text{ ends at period} \\ 1 & \text{if } w_i \text{ ends at comma} \\ 0 & \text{otherwise} \end{cases} \quad (2)$$

In Equation (2), $w_i$ represents the i-th morpheme.

Next, the divider 20B divides the target sentence data 30 into a plurality of correction segments 32 by using the division scores.

For example, a threshold $T_1^S$ and a threshold $T_2^S$ satisfying a relation of $T_1^S < T^S < T_2^S$ are set. The threshold $T_1^S$ is a value that represents a minimum time length of an allowed correction segment, and, for example, is 300. The threshold $T_2^S$ is a value that represents a maximum time length of an allowed correction segment and, for example, is 10000.

$$t_n^e - t_1^b > T^S \quad (3)$$

$$\operatorname*{argmax}_k S_k \quad (4)$$

$$T_1^S \le t_k^e - t_1^b \le T_2^S \quad (5)$$

Then, in a case where the relation of Inequality (3) described above is satisfied, the divider 20B uses a morpheme string that satisfies Expression (4) described above and Inequality (5) and is continuous in a speech generation time elapsing direction as one correction segment 32.

In addition, in Inequality (3), $t_n^e$ represents the end time of the last morpheme included in the target sentence data 30, and $t_1^b$ represents the start time of the first morpheme included in the target sentence data 30. In other words, the left side ($t_n^e - t_1^b$) of Inequality (3) represents the length (time length) of the target sentence data 30.

In Expression (4), k represents a division position. In addition, in Expression (4), $S_k$ represents a division score. In Equation (5), $t_k^e$ represents the end time of the k-th morpheme, and $t_i^b$ represents the start time of the first morpheme.

In this way, the divider 20B divides the text data included in the target sentence data 30 into a plurality of correction segments 32.

As illustrated in FIG. 3, the target sentence data 30 is divided into a plurality of correction segments 32 in accordance with the division scores.

FIG. 3 illustrates a case where the target sentence data 30 is divided into correction segments 32 by using α=2, β=3, $T_1^S=300$, $T^S=4000$, and $T_2^S=10000$ as an example.

Also in a case where the text data is represented in another language other than English (e.g., Japanese), similarly, the divider 20B may calculate a division score for each morpheme and divide the target sentence data 30 into correction segments 32.

The description will be continued by referring back to FIG. 2. The corrector 20C corrects a morpheme or speech generation time (the start time and the end time in this embodiment) included in the correction segment 32 in accordance with an operation input made by a user.

First, the corrector 20C outputs a correction segment 32 to the display controller 20F. The display controller 20F performs control of displaying a correction screen used for correcting morphemes included in the correction segment 32 on the UI unit 24. A user performs a correction operation by operating the UI unit 24 while referring to morphemes included in the correction segment 32 displayed on the UI unit 24. The receiver 20G receives an input made by the user.

The user, for example, performs a correction operation through the UI unit 24 by using a pen. In this embodiment, a case will be described in which a user performs a correction operation by directly writing a stroke on the correction screen by using a stylus pen.

For example, a user designates a kind of correction operation by using a gesture (a form of the stroke) and a position. Here, a gesture represents the form of a stroke recognized according to a user input and enables a user operation by associating the form of an input stroke and a correction operation with each other in advance. A stroke is a stoke that is input through handwriting and, for example, represents a trajectory until a pen or the like is separated away from an input surface after being in contact with the input surface.

FIG. 4 is a schematic diagram that illustrates an example of a correspondence between the kind of correction operation and the form of a stroke. As the kinds of correction operation, for example, there are four kinds of deletion, insertion, substitution, and confirmation. The kind "deletion" of correction operation represents deletion of a designated portion. The "insertion" represents insertion of a new character string or an image (hereinafter, may be referred to as a corrected text string) into a designated portion. The "substitution" represents substitution of a designated portion with a new character string or an image. The "confirmation" represents that a correction up to the designated portion is confirmed.

A user inputs a desired stroke on the corrected screen displayed on the UI unit 24. The receiver 20G receives a user's input and specifies a kind of correction operation, a character string that is a correction target, and the like based on the position of a feature point in the form of a stroke.

In addition, in the case of the "insertion" or the "substitution", a user needs to input a corrected text string (a text string or an image) for insertion or substitution. In this embodiment, the corrected screen includes a handwriting input field.

A user inputs a corrected text string for insertion or substitution in the handwriting input field on the correction screen by using a stylus pen. Then, for example, when the outer side of the handwriting input field is touched by the user, the receiver 20G accepts that the input for the handwriting input field ends.

Then, the corrector 20C accepts an image of a stroke set input to the handwriting input field through the receiver 20G as a corrected character string. In addition, the corrector 20C may perform known text recognition processing for the image of the stoke set input to the handwriting input field and accept a text representing a result of the text recognition processing as a corrected character string.

FIGS. 5A to 5F are schematic diagrams that illustrate an example of a correction screen 40. On the correction screen 40, a confirmation area 41A and a correction area 41B are arranged.

The confirmation area 41A is an area in which a confirmed sentence 34 is displayed. The confirmed sentence 34 is text data of which a correction corresponding to a correction segment 32 is confirmed.

The correction area 41B is an area in which a correction segment 32 that is in the middle of correction is displayed. In the correction area 41B, there are cases where a handwriting input area H is displayed. A user inputs a corrected character string by writing a stroke to the handwriting input area H by using a stylus pen P or the like.

Figure 5A:
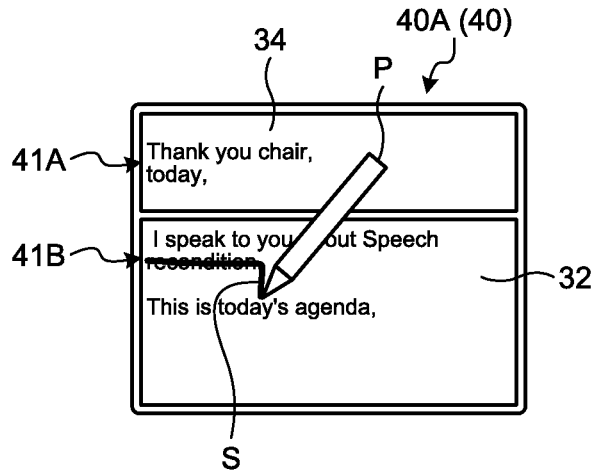
FIGS. 5A to 5F are schematic diagrams of a correction screen.
Figure 5B:
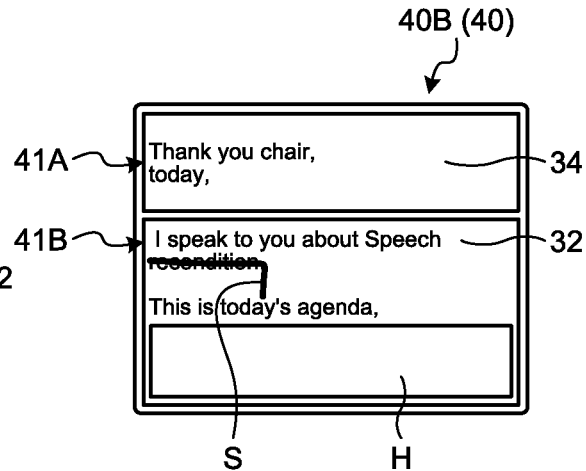

For example, as illustrated in FIG. 5A, in a correction segment 32 displayed in the correction area 41B, "recondition" written in English is assumed to be substituted with "recognition". In this case, a user inputs a stroke "S" of a form corresponding to "substitution" on "recondition" that is a correction target by operating the stylus pen P (see a correction screen 40A of FIG. 5A). Then, a stroke is accepted through the receiver 20G. When "substitution" that is a type of correction operation is specified by recognizing the stroke, the corrector 20C displays a correction screen 40B including the handwriting input area H in the UI unit 24 (see the correction screen 40B of FIG. 5B).

Figure 5C:
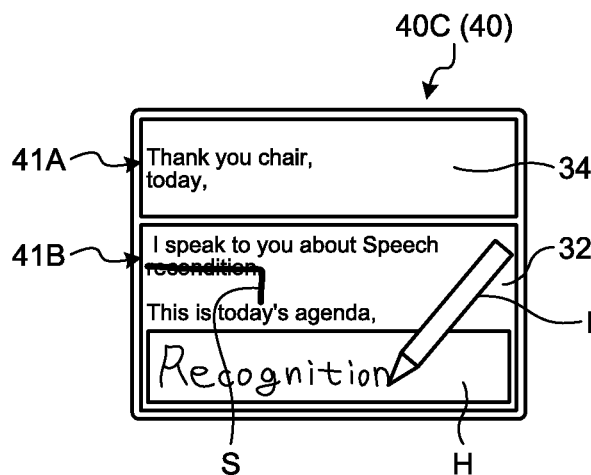
Figure 5D:
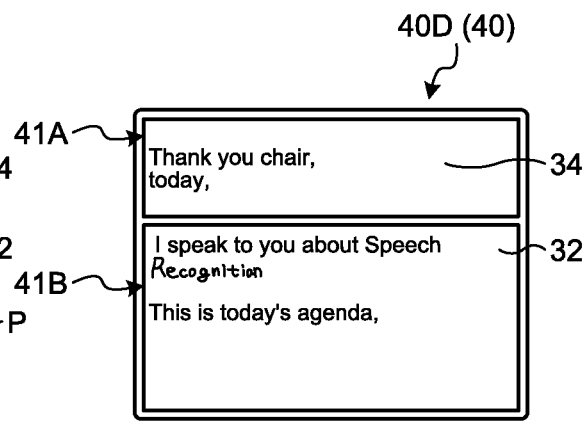

For example, it is assumed that a user performs a handwriting input of characters of "recognition" for the handwriting input area H and touches the outer side of the handwriting input area H (see a correction screen 40C of FIG. 5C). Then, the corrector 20C substitutes "recondition" written in English in the correction segment 32 displayed in the correction area 41B with "recognition" that is the handwriting input (see a correction screen 40D of FIG. 5D).

Figure 5E:
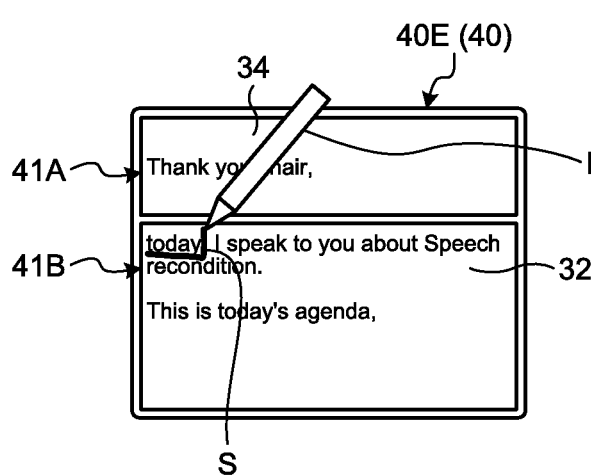

In addition, in a case where the correction is confirmed, as illustrated in FIG. 5E, the user inputs a stroke representing a confirmed range in the correction segment 32 displayed in the correction area 41B. For example, the user inputs a stroke "S" corresponding to "confirmation" to pass between "today" and "I" written in English by operating the stylus pen P (see a correction screen 40E of FIG. 5E). Then, when the stroke is accepted through the receiver 20G, the corrector 20C specifies "confirmation" that is the type of correction operation.

The corrector 20C handles time when a stroke of a form corresponding to the type "confirmation" of correction operation is drawn as confirmation time of the confirmed sentence 34 corresponding to the correction segment 32 for which the stroke is drawn.

Figure 5F:
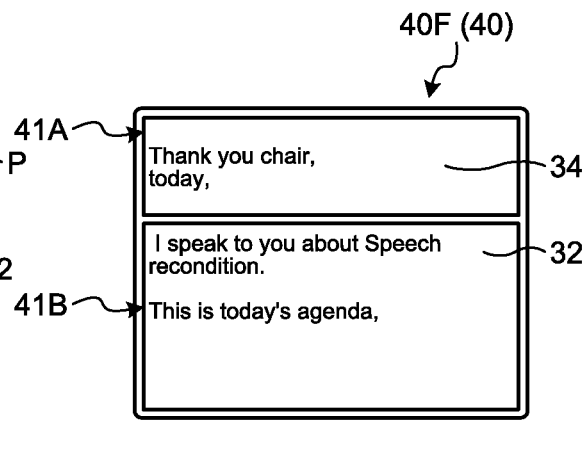

Then, the corrector 20C deletes "today" that is the confirmed correction segment 32 from the correction area 41B and performs control of the display controller 20F such that "today" is moved to the confirmation area 41A as a confirmed sentence 34 corresponding to the correction segment 32. For this reason, a correction screen 40F illustrated in FIG. 5F is displayed in the UI unit 24.

In this way described above, the user sequentially corrects the correction segments 32 displayed in the correction area 41B to be confirmed sentences 34 of which corrections are confirmed.

Then, the operation of "confirmation" described above is repeated, and, when all the correction segments 32 displayed in the correction area 41B become confirmed sentences 34, a state is formed in which user's corrections are confirmed for all the correction segments 32 included in the target sentence data 30.

FIGS. 5A to 5F illustrate an example of the correction screen 40 in a case where text data is written in English. However, also in a case where text data is written in another language other than English (e.g., Japanese), similarly, the corrector 20C may display the correction screen 40 on the UI unit 24.

Here, there are cases where the length of at least a part of text data included in the correction segment 32 is changed according to the correction process performed by a user. For example, there are cases where a correction operation such as deletion or substitution of at least a part of a phoneme included in the correction segment 32, substitution with another longer word or phrase, substitution with another shorter word or phrase, or insertion of another phoneme is performed.

In such cases, there are cases where there is a deviation in the speech generation time corresponding to each morpheme included in the correction segment 32.

Thus, the corrector 20C maintains speech generation time (in this embodiment, start time and end time) corresponding to each morpheme before correction as possibly as can and associates the speech generation time with the morpheme after correction.

Figures 6A, 6B, 7:
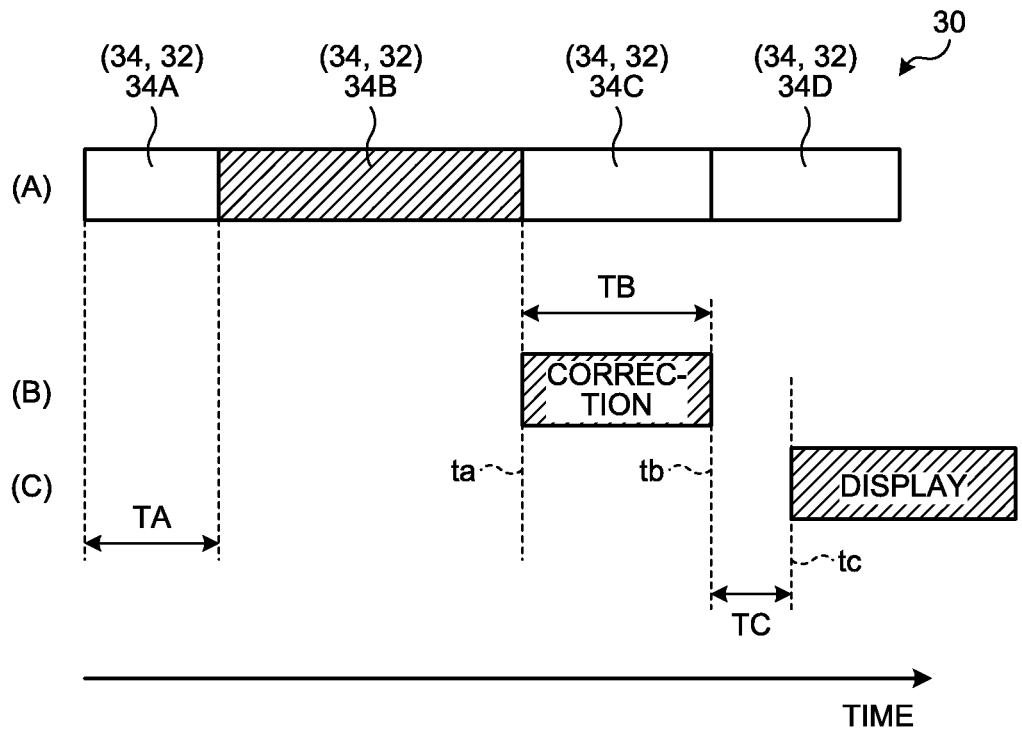
FIGS. 6A and 6B are schematic diagrams that illustrate the corrections of speech generation time.
FIG. 7 is an explanatory diagram that illustrate assignment of display time.

FIGS. 6A and 6B are schematic diagrams that illustrate an example of the corrections of speech generation time. For example, it is assumed that a morpheme "well" has been deleted according to a user's correction operation in a correction segment 32E illustrated in FIG. 6A. In addition, it is assumed that morphemes "no" and "beans" have been respectively replaced with "know," and "been". In addition, it is assumed that a new morpheme "to" has been inserted between morphemes "been" and "Japan".

In this case, text data (34E) included in a confirmed sentence 34 corresponding to the correction segment 32E is as illustrated in FIG. 6B. The corrector 20C associates speech generation time (start time, end time) corresponding to each changed morpheme with speech generation time (start time, end time) corresponding to the morpheme before change. For example, the corrector 20C associates speech generation time (start time "430" and end time "501") corresponding to the morpheme "no" before substitution with the morpheme "know," after substitution. Similarly, the corrector 20C associates speech generation time corresponding to a morpheme before substitution with the morpheme "been" after substitution.

Meanwhile, regarding speech generation time corresponding to a newly inserted morpheme, the corrector 20C may use the end time of another morpheme that is positioned one morpheme before the newly inserted morpheme and the start time of another morpheme positioned one morpheme after the newly inserted morpheme as start time and end time corresponding to the newly inserted morpheme. More specifically, as illustrated in FIG. 6B, as the start time of the morpheme "to" that is newly inserted, the end time "716" of the morpheme "been" positioned one morpheme before the newly inserted morpheme is used. In addition, as the end time of the morpheme "to" that is newly inserted, the start time "760" of the morpheme "Japan" that is positioned one morpheme after the newly inserted morpheme is used.

In addition, there are cases where a correction operation of inserting a new morpheme to the start or the end of the correction segment 32. In such cases, the corrector 20C may associate speech generation time in which a difference between start time and end time is "0" with the morpheme. More specifically, the corrector 20C may insert a new morpheme before a first morpheme included in a corresponding correction segment 32 with the start time of speech generation time corresponding to the first morpheme set as the start time and the end time. In addition, the corrector 20C may insert a new morpheme after a last morpheme included in a corresponding correction segment 32 with the end time of speech generation time corresponding to the last morpheme set as the start time and the end time.

In addition, also in a case where a morpheme is written in another language other than English, similarly, the corrector 20C may maintain speech generation time (in this embodiment, start time and end time) corresponding to a morpheme before correction as possibly as can and associate the speech generation time with a morpheme after correction.

Since a user's correction operation can be performed in units of displayed texts, there are cases where the correction operation is not performed in units represented in the correction segment 32.

In such cases, the corrector 20C may use speech generation time (start time, end time) corresponding to a word before deletion as it is as speech generation time (start time, end time) corresponding to a word that is partially deleted.

Similarly, there are also cases where "substitution" according to a user's correction operation is not performed in units represented in the correction segment 32.

In such cases, the corrector 20C may associate a word, which is partially changed, of the correction segment 32F with speech generation time (start time, end time) corresponding to the correction segment 32 before change. Then, speech generation time may be assigned similarly to the description presented above by regarding a word after substitution as a newly inserted morpheme. In other words, the corrector 20C may respectively use the end time of another morpheme that is positioned one morpheme before the newly inserted morpheme and the start time of another morpheme positioned one morpheme after the newly inserted morpheme as start time and end time corresponding to the newly inserted morpheme.

In addition, there are cases where a time period of the speech generation time associated with the correction segment 32 in accordance with "substitution" according to a user's correction operation is not included in the confirmed sentence 34.

In such cases, the corrector 20C maintains speech generation time (start time, end time) corresponding to a morpheme of the correction segment 32F that is a correction target and assigns a period of the maintained speech generation time to the morpheme after substitution.

Furthermore, there are cases where a correction character string is inserted into the correction segment 32 in accordance with a user's correction operation. In such cases, the corrector 20C divides a word at a position directed by the user and inserts the correction character string.

In such a case, the corrector 20C may divide a period represented by the speech generation time corresponding to the morpheme before the insertion of the correction character string by performing linear interpolation for the period in accordance with the length of the morpheme after half-division or division and assign the divided period.

In addition, at confirmation time, there are a case where the position of a punctuation confirmed according to user's drawing of the stroke corresponding to "confirmation" coincides with a boundary between morphemes accompanying speech generation time and a case where the position of the punctuation does not coincide therewith.

In a case where the position of the confirmed punctuation coincides with a boundary between morphemes, the corrector 20C may associate speech generation time corresponding to each of such morphemes of the correction segment 32 with a morpheme after correction.

On the other hand, in a case where the position of the confirmed punctuation does not coincide with a boundary between morphemes, the corrector 20C, similarly to a case where a morpheme of the correction segment 32 before correction is divided, may associate corresponding speech generation time with a morpheme after correction.

In addition, the corrector 20C may directly handle an image of hand-written characters that is input through hand writing by a user as a correction character string as it is. For example, as described with reference to FIGS. 5C and 5D, an image of a hand-written character input to the handwriting input area H may be handled as a correction character string as it is. In such a case, the corrector 20C may handle the image of the hand-written characters input to the handwriting input area H as a correction character string of one morpheme. In addition, there are cases where hand-written characters input through hand writing include a plurality of words. Also in such cases, the corrector 20C may handle the hand-written input character string as one morpheme.

The description will be continued by referring back to FIG. 2. Next, the assigner 20D will be described. The assigner 20D assigns display time according to a difference between a confirmed sentence 34 of the target sentence data 30 according to a user's correction and another confirmed sentence 34 of previous speech generation time. Hereinafter, a difference between the confirmed sentence 34 and another confirmed sentence 34 of previous speech generation time may be referred to as a speech generation time difference in description.

The speech generation time difference, for example, is a speech generation time difference between a confirmed sentence 34 and another confirmed sentence 34 having previous speech generation time of the confirmed sentence 34. More specifically, the speech generation time difference is a difference between the start time of a first morpheme included in a confirmed sentence 34 and the start time of a first morpheme included in another confirmed sentence 34 that is the previous confirmed sentence.

The display time is time when the confirmed sentence 34 is displayed. In this embodiment, a case will be described as an example in which the display time represents a difference between confirmation time of the confirmed sentence 34 and the display of a subtitle of the confirmed sentence 34.

In addition, the display time may represent a relative position (relative position in time) of a confirmed sentence 34 in the target sentence data 30. Furthermore, the display time may represent actual display time. In such a case, the assigner 20D may convert the difference described above into such a relative position or display time and use the difference as the display time.

In this embodiment, as the speech generation time difference increases, the assigner 20D assigns display time having a larger difference from the confirmation time of the confirmed sentence 34 to the confirmed sentence 34.

In more details, the assigner 20D, for a target confirmed sentence 34 to which display time is to be assigned, assigns the display time to the confirmed sentence 34 such that, as a difference (a speech generation time difference) between the start time (the start of the speech generation time) of the first morpheme of the confirmed sentence 34 and the start time (the start of the speech generation time) of the first morpheme of another confirmed sentence 34 of the previous speech generation time increases, a difference between the confirmation time of the confirmed sentence 34 that is the target to which the display time is assigned and the display time of a subtitle of the confirmed sentence 34 increases. The difference from the confirmation time of the confirmed sentence 34 represents a time difference between the confirmation time of the confirmed sentence 34 and a time when the subtitle of the confirmed sentence 34 is displayed.

More specifically, the assigner 20D uses a value acquired by multiplying the speech generation time difference by a constant α as the difference described above. As the constant α, a value set in advance may be used.

Here, the display period of a subtitle corresponding to the confirmed sentence 34 to which the display time is assigned is a period from time when the display of the confirmed sentence 34 is started to time acquired by adding the speech generation time difference to the confirmation time of another confirmed sentence 34 of the next speech generation time of the speech generation time of the confirmed sentence 34.

For this reason, from a viewpoint of suppressing the delay of the display of the subtitle of the confirmed sentence 34 more than necessary, the constant α is preferably a value less than one.

By assigning such display time to each confirmed sentence 34, a confirmed sentence 34 corresponding to a portion in which a speaker talks slowly is displayed for a relatively long period, and a confirmed sentence 34 corresponding to a portion in which a speaker talks fast is displayed for a relatively short period. More specifically, as a difference (a speech generation time difference) between the speech generation time of a previous confirmed sentence 34 and the speech generation time of the confirmed sentence 34 increases, there is a high possibility that the speech generation of the previous confirmed sentence 34 is speech generation of slow speech of the speaker or speech generation having an interval from the next speech generation. For this reason, by assigning display time having a larger difference from the confirmation time of a confirmed sentence 34 to the confirmed sentence 34 that is spoken after this previous confirmed sentence 34 as the speech generation time difference increases, the previous confirmed sentence 34 is continuously displayed for a longer period. In other words, the assigner 20D can assign display time such that each confirmed sentence 34 is displayed at an interval close to the interval of the generation of the original speech.

FIG. 7 is an explanatory diagram that illustrate an example of the assignment of display time. For example, as illustrated in (A) of FIG. 7, it is assumed that each correction segment 32 included in target sentence data 30 is corrected to a confirmed sentence 34 by the corrector 20C. Then, it is assumed that the target sentence data 30 includes confirmed sentences 34A, 34B, 34C, and 34D in order of speech generation time.

Then, it is assumed that the assigner 20D assigns display time to the confirmed sentence 34B. In addition, in order to correct the correction segment 32 to the confirmed sentence 34B, a period TB from start time ta to confirmation time tb is assumed to be required (see (B) of FIG. 7). In this case, the assigner 20D calculates a speech generation time difference TA between the start time of a morpheme having earliest speech generation time among morphemes included in the previous confirmed sentence 34A and the start time of a morpheme having earliest speech generation time among morphemes included in the confirmed sentence 34B. Then, the assigner 20D assigns display time tc having a larger difference TC from the confirmation time tb to the confirmed sentence 34B as the speech generation time difference TA increases.

As described above, the assigner 20D may assign the speech generation time difference TA to the confirmed sentence 34B as the display time tc.

The assigner 20D similarly assigns display time to each of the other confirmed sentences 34.

The assignment of display time will be described more specifically.

FIGS. 8A and 8B are explanatory diagrams that illustrate assignment of display time of a case where morphemes are represented in English.

For example, it is assumed that target sentence data 30 includes a confirmed sentence 34A and a confirmed sentence 34B (see FIGS. 8A and 8B). In addition, it is assumed that speech generation time (start time, end time) illustrated in FIGS. 8A and 8B is associated with each morpheme included in each confirmed sentence 34 by the corrector 20C.

In this case, the assigner 20D subtracts start time "0" corresponding to the first morpheme "Thank" of the previous confirmed sentence 34A' from start time "1520" corresponding to the first morpheme "today," of a confirmed sentence 34B as the display time of the confirmed sentence 34B (1520-0). Accordingly, the assigner 20D calculates a speech generation time difference "1520". Then, the assigner 20D assigns a value "760" (in other words, the difference) acquired by multiplying the speech generation time difference "1520" by the constant α (for example, "0.5") to a confirmed sentence 34B' as the display time. In addition, display time corresponding to the first confirmed sentence 34A' of the target sentence data 30 is fixed to "0".

In this way, also in a case where morphemes are not represented in English, similarly, the assigner 20D assigns the display time to each confirmed sentence 34.

Here, a method of calculating the display time is not limited to the form using an expression of multiplying the speech generation time difference by the constant α as described above. More specifically, the method is not limited to the form using an equation of f(x)=αx (here, α represents the constant α described above). For example, the assigner 20D may calculate the display time using a function monotonously increasing according to the speech generation time difference.

As described above, the assigner 20D assigns display time having a larger difference from the confirmation time of a confirmed sentence 34 as the speech generation time difference increases to the confirmed sentence 34. In addition, it is preferable that the assigner 20D arranges an upper limit and a lower limit of the difference.

More specifically, it is preferable to arrange the upper limit and the lower limit of the difference so as to satisfy a relation represented in the following Equation (6) and Equation (7).

$$V_i^R = f'(t_i^R - t_{i-1}^R) \quad (6)$$

$$f'(x) = \begin{cases} T^{min} \text{ if } x \le T^{min}/\alpha \\ \alpha x \text{ if } T^{min}/\alpha < x < T^{max}/\alpha \\ T^{max} \text{ if } T^{max} \end{cases} \quad (7)$$

In Equation (6), $V_i^R$ represents display time (here, a difference). In Equation (7), $(t_i^R - t_{i-1}^R)$ represents a speech generation time difference. In Equation (7), α is a constant similarly to the description presented above. $T^{min}$ represents the lower limit of the difference. $T^{max}$ represents the upper limit of the difference.

By using Equation (6) and Equation (7) described above, the assigner 20D can calculate the difference to be the lower limit $T^{min}$ or more and the upper limit $T^{max}$ or less.

In addition, arbitrary values may be set to the lower limit $T^{min}$ and the upper limit $T^{max}$ in advance. For example, a shortest display time desired by the user may be set to the lower limit $i^{min}$ in advance. The shortest display time, for example, is 300 seconds. A longest display time may be set to the upper limit $T^{max}$ in advance. The longest display time, for example, is 10000 seconds.

The description will be continued by referring back to FIG. 2. The output unit 20E transmits the target sentence data 30 in which display time is assigned to each confirmed sentence 34 by the assigner 20D to the display terminal 14.

Hereinafter, the target sentence data 30 in which display time is assigned to each confirmed sentence 34 may be referred to as a display sentence 37 in description.

Here, when the output unit 20E transmits a display sentence 37 including unnecessary information for display to the display terminal 14, there are cases where a problem of tightening the frequency band of the network 16. For this reason, it is preferable that the output unit 20E transmits only a display sequence ID representing the display sequence of a confirmed sentence 34, a morpheme string included in the confirmed sentence 34 corresponding to the display sequence ID, and display time of the confirmed sentence 34 corresponding to the display sequence ID to the display terminal 14 as a display sentence 37.

Here, the data format of the display sentence 37 transmitted from the output unit 20E to the display terminal 14 is not limited. The display format of the display sentence 37, for example, is a JSON format, XML, a text form, a binary representation, or the like.

The display terminal 14 displays a confirmed sentence 34 included in the display sentence 37 that is received from the information processing apparatus 10 on the display in accordance with corresponding display time. For this reason, a subtitle representing each confirmed sentence 34 is sequentially displayed on the display at display time corresponding to the confirmed sentence 34.

For example, when the display sentence 37 is received, the display terminal 14 pools the display sentence 37 once. Then, the display terminal 14 sequentially displays confirmed sentences in order from a confirmed sentence 34 of which the display sequence represented by the display sequence included in the display sentence 37 is earliest on the display. At this time, when display time (for example, a difference) represented in the confirmed sentence 34 elapses after the previous confirmed sentence 34 is displayed on the display, the display terminal 14 repeats the process of displaying a confirmed sentence 34 of a next display sequence on the display.

In addition, it is preferable that the display terminal 14 performs auto-scroll such that a latest confirmed sentence 34 is constantly displayed on the display.

Here, it is assumed that the display time is represented as the difference described above (see the difference TC illustrated in FIG. 7). In this case, the confirmed sentence 34 is displayed at display time acquired by adding a time (see a time TB illustrated in FIG. 7) required for the correction of the correction segment 32 and a difference (see a difference TC illustrated in FIG. 7) to the end time (see time to illustrated in FIG. 7) of the correction segment 32 corresponding to the confirmed sentence 34. In other words, the confirmed sentence 34 is displayed at time when the difference TC (display time) assigned to the confirmed sentence 34 elapses from the confirmation time (see confirmation time tb illustrated in FIG. 7) at which the correction of the confirmed sentence 34 is confirmed (see (C) of FIG. 7).

In other words, as described with reference to FIG. 7, the confirmed sentence 34B is displayed as a subtitle when the difference TC elapses from time (in other words, the confirmation time tb) acquired by adding the correction time TB of the confirmed sentence 34B to the end time ta of the speech generation time corresponding to the correction segment 32 corresponding to the confirmed sentence 34B.

Here, conventionally, the confirmed sentence 34B is displayed at the confirmation time tb when the correction is confirmed. For this reason, there are cases where the subtitle of a confirmed sentence 34 spoken at the next timing is displayed in the middle of or before user's recognition of the subtitle of a confirmed sentence 34 having earlier speech generation time. For this reason, conventionally, there are cases where it is difficult for a user to read the subtitle.

On the other hand, according to the information processing apparatus 10 of this embodiment, a confirmed sentence 34 is displayed according to the display time (the difference TC) assigned according to the speech generation time difference TA. For this reason, according to the information processing apparatus 10 of this embodiment, the subtitle of speech is provided to be easily read.

Figure 9:
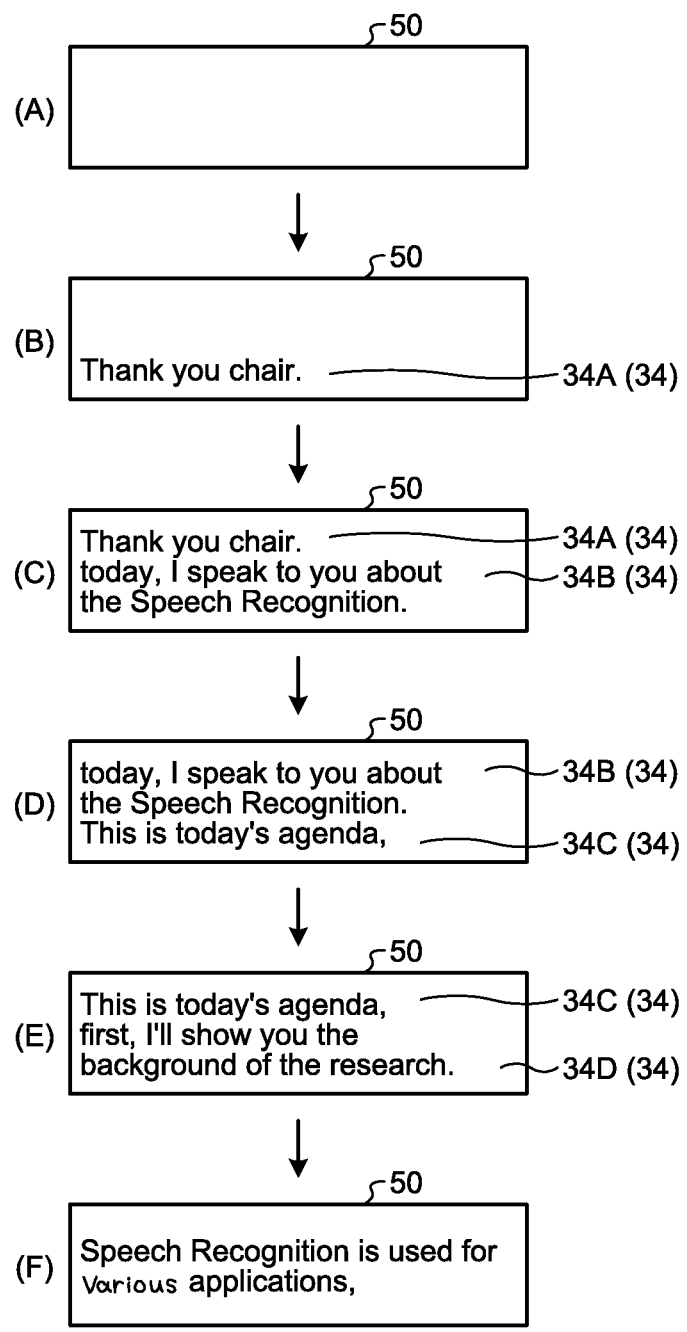
FIG. 9 is a schematic diagram that illustrate display screens.

FIG. 9 is a schematic diagram that illustrate an example of the display screen 50 displayed on the display of the display terminal 14.

FIG. 9 illustrates a case where the display terminal 14 sequentially displays confirmed sentences 34 (confirmed sentences 34A to 34D) included in a display sentence 37 including morphemes written in English as subtitles.

In this case, for example, first, in the initial state, no subtitle is displayed on the display screen 50 (see (A) of FIG. 9). It is assumed that the display time assigned to the first confirmed sentence 34A "Thank you chair." is "0". In this case, when a display sentence 37 including the confirmed sentence 34A is received, the display terminal 14 displays a subtitle representing the confirmed sentence 34A on the display screen 50 (see (B) of FIG. 9).

Then, the display terminal 14 scrolls the subtitle "Thank you chair." representing the confirmed sentence 34A by one line and displays a subtitle "today, I speak to you about the Speech Recognition." representing the confirmed sentence 34B at the bottom in accordance with the display time of the confirmed sentence 34B (see (C) of FIG. 9).

Then, the display terminal 14 scrolls the subtitle "today, I speak to you about the Speech Recognition." representing the confirmed sentence 34B by one line and displays a subtitle "This is today's agenda," representing the confirmed sentence 34C at the bottom in accordance with the display time of the confirmed sentence 34C (see (D) of FIG. 9).

Then, the display terminal 14 scrolls the subtitle "This is today's agenda," representing the confirmed sentence 34C by one line and displays a subtitle "first, I'll show you the background of the research." representing the confirmed sentence 34D at the bottom in accordance with the display time of the confirmed sentence 34D (see (E) of FIG. 9).

As described above, there are cases where an image of hand-written characters input through user's hand writing is handled as a correction character string as it is. In such cases, the display terminal 14 may display a morpheme represented by the image of the hand-written characters included in the confirmed sentence 34 with being maintained as the image of the hand-written characters. In such a case, for example, as illustrated in (F) of FIG. 9, the display terminal 14 may display a display screen 50 including the image "various" of the hand-written characters.

Here, like a conventional system, in a case where each confirmed sentence 34 is displayed at confirmation time, there are problems as described below. For example, as illustrated in FIG. 9, it is assumed that the confirmed sentence 34B is a sentence longer than the confirmed sentence 34C. In addition, it is assumed that the correction time of the confirmed sentence 34B is a long time (for example, "3000" seconds). On the other hand, it is assumed that the correction time of the confirmed sentence 34C is a short time (for example, "600" seconds).

In this case, like a conventional system, when each of the confirmed sentence 34B and the confirmed sentence 34C is displayed at the confirmation time of each confirmed sentence 34, there are cases where the next confirmed sentence 34C is displayed in the middle of user's reading of the confirmed sentence 34B that is a long sentence.

On the other hand, in this embodiment, display time (see the difference TC illustrated in FIG. 7) according to the speech generation time difference (see the speech generation time difference TA illustrated in FIG. 7) of the speech generation time is assigned to the confirmed sentence 34. For this reason, the display terminal 14 displays each confirmed sentence 34 in accordance with the assigned display time, whereby the display time of the subtitle of the confirmed sentence 34B that is a long sentence is secured.

In addition, the number of lines of a subtitle displayed on the display screen 50 is not limited to three. For example, the number of the subtitle displayed on the display screen 50 may be one.

In addition, in a case where a display sentence 37 including an image of hand-written characters is transmitted to the display terminal 14, the output unit 20E of the information processing apparatus 10 needs to encode the image of the hand-written characters. In this case, the output unit 20E may represent strokes represented in the image of the hand-written characters as a text and, after converting the image of the hand-written characters into a raster image, may encode the raster image using a method of Base64 or the like.

For example, in a case where a JSON-formatted text of a stroke representing an image of hand-written characters as a text is used, an ID of the image of the hand-written characters may be embedded in a text character string by using an image tag. In addition, in this case, the output unit 20E may encode the stroke representing the image of the hand-written characters and the size (a width and a height) of the image of the hand-written characters. In this way, the image of the hand-written characters maintaining the shape (for example, the aspect ratio) input through hand writing is displayed on the display screen 50.

Figure 10:
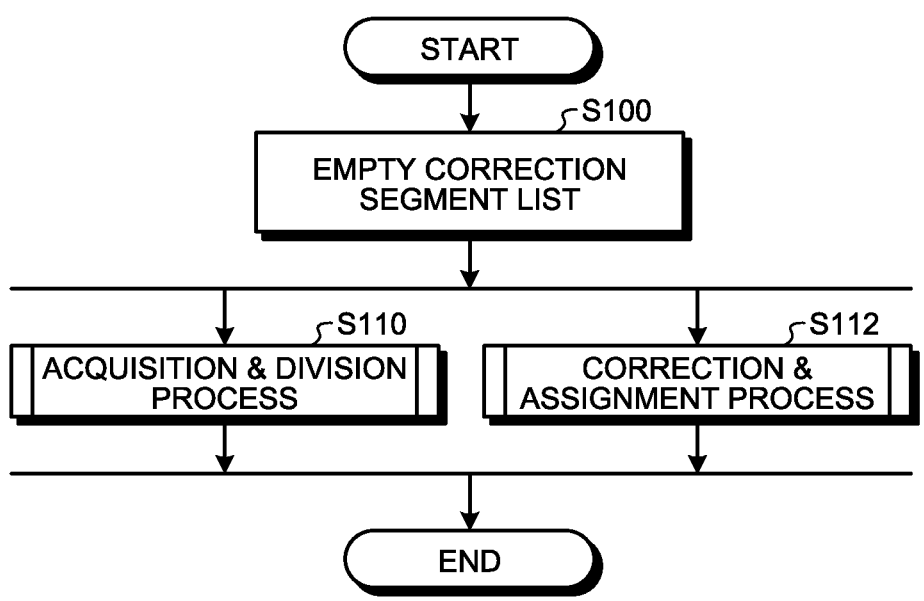
FIG. 10 is a flowchart of the sequence of information processing.

Next, an example of the sequence of information processing performed by the information processing apparatus 10 according to this embodiment will be described. FIG. 10 is a flowchart that illustrates an example of the sequence of the information processing performed by the information processing apparatus 10.

First, the controller 20 empties a correction segment list 36 used for registering a list of correction segments 32 acquired by dividing target sentence data 30 (Step S100).

Then, the controller 20 performs an acquisition & division process (Step S110) and a correction & assignment process (Step S112) in parallel with each other. The acquisition & division process is a process in which the acquirer 20A acquires the target sentence data 30, and the divider 20B divides the target sentence data 30 into correction segments 32. The correction & assignment process is a process in which the corrector 20C corrects each correction segment 32, and the assigner 20D assigns display time to a confirmed sentence 34 corresponding to the correction segment 32.

In a case where the acquisition & division process (Step S110) and the correction & assignment process (Step S112) are performed, the acquirer 20A, the divider 20B, the corrector 20C, and the assigner 20D share a same correction segment list 36 to be used.

In Step S110, the divider 20B divides the target sentence data 30 acquired by the acquirer 20A into correction segments 32 and registers the correction segments in the correction segment list 36. In Step S112, the corrector 20C and the assigner 20D processes the correction segments 32 added to the correction segment list 36 in order of addition.

Figure 11:
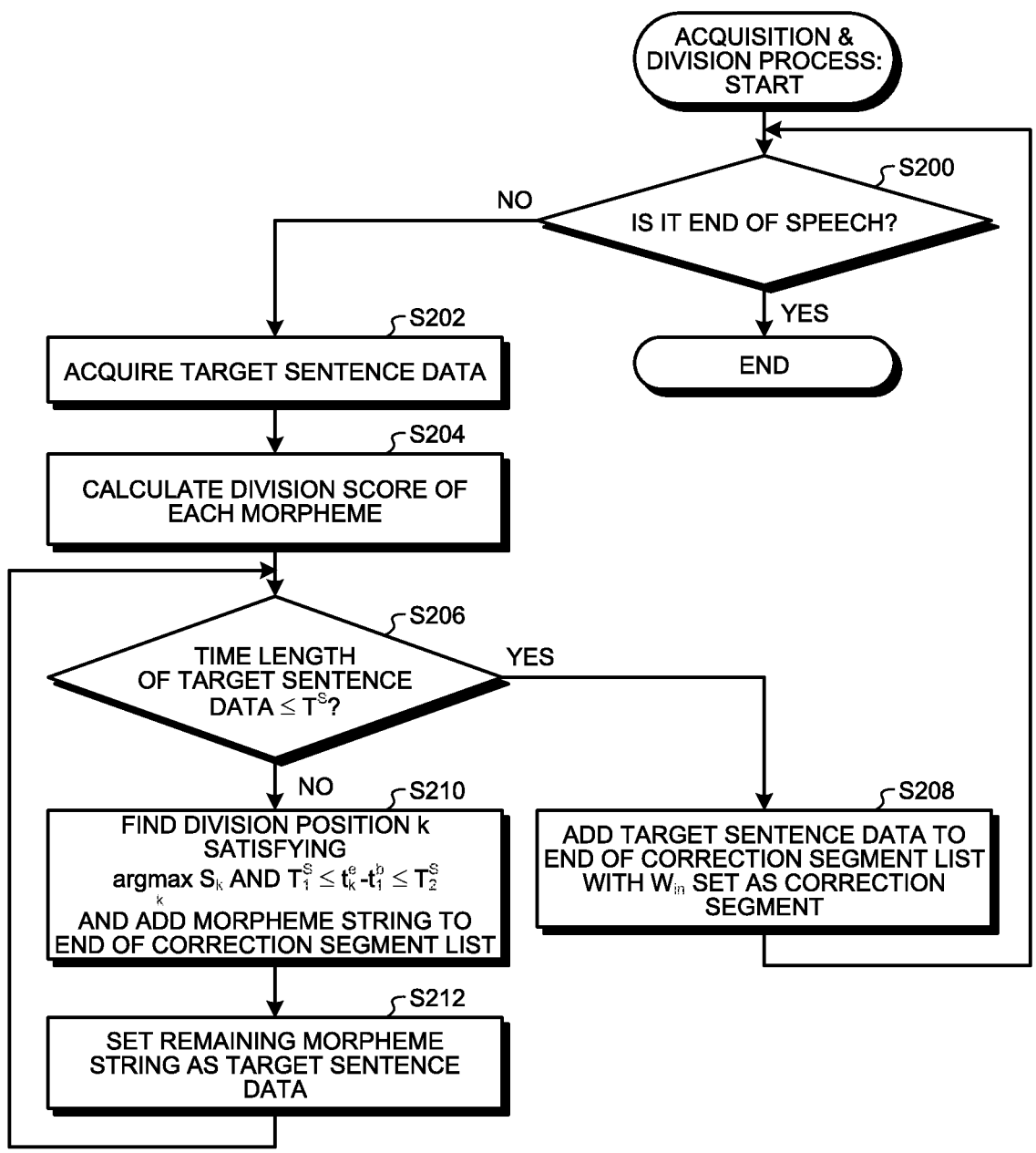
FIG. 11 is a flowchart of the sequence of an acquisition & division process.

FIG. 11 is a flowchart that illustrates an example of the sequence of the acquisition & division process (see Step S110 illustrated in FIG. 10). FIG. 11 illustrates an example of the sequence of a case where the acquirer 20A acquires target sentence data 30 for each group (morpheme string) of morphemes in which a plurality of the morphemes are continuous. In addition, it is assumed that speech-recognized morphemes are sequentially transmitted from the speech recognition terminal 12 to the information processing apparatus 10 together with speech generation time.

First, the acquirer 20A sequentially acquires results of speech recognition from the speech recognition terminal 12.

Then, the acquirer 20A determines whether or not each acquired result of speech recognition represents the end of speech (Step S200). For example, the acquirer 20A performs a determination of Step S200 by determining whether or not a flag (in other words, a flag representing the end of the target sentence data 30) representing the end of speech is included in the acquired result of speech recognition.

In a case where it is determined that the result does not represent the end of speech (Step S200: No), the process proceeds to Step S202. In Step S202, the acquirer 20A acquires target sentence data 30 (Step S202).

Next, the divider 20B calculates a division score for each of morphemes included in the target sentence data 30 acquired in Step S202 (Step S204).

Next, the divider 20B determines whether or not the time length of the target sentence data 30 acquired in Step S202 is the time length $T^S$ set in advance or less (Step S206).

In a case where "Yes" is determined in Step S206 (Step S206: Yes), the process proceeds to Step S208. In Step S208, the target sentence data 30 ($W_{in}$) acquired in Step S202 is added to the end of the correction segment list 36 as one correction segment 32 (Step S208). Then, the process proceeds to Step S200.

On the other hand, in a case where "No" is determined in Step S206 (Step S206: No), the process proceeds to Step S210. In Step S210, the divider 20B, for the target sentence data 30 acquired in Step S202, finds a division position k satisfying the relations of Expression (4) and Inequality (5) described above and adds a morpheme string of up to the division position k from the start of the target sentence data 30 to the end of the correction segment list 36 as a correction segment 32 (Step S210).

Next, the divider 20B sets the remaining morpheme string as new target sentence data 30 (Step S212), and the process is returned to Step S206.

On the other hand, in a case where it is determined in Step S200 that the result represents the end of speech (Step S200: Yes), this process ends.

Figure 12:
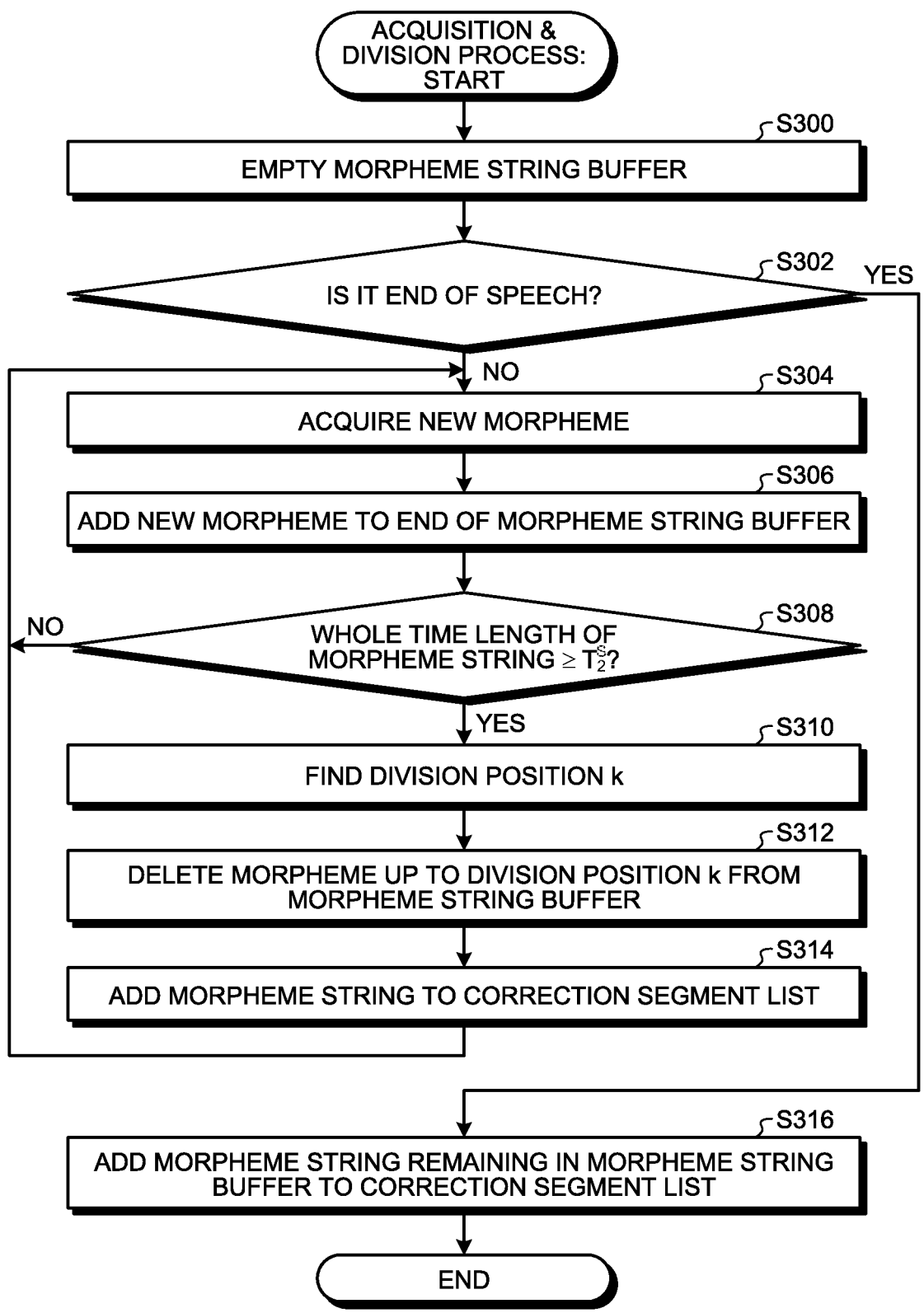
FIG. 12 is a flowchart of the sequence of an acquisition & division process.

FIG. 12 is a flowchart that illustrates an example of the sequence of the acquisition & division process (see Step 5110 illustrated in FIG. 10). FIG. 12 illustrates an example of the sequence of a case where the acquirer 20A acquires a result of speech recognition for each morpheme from the speech recognition terminal 12.

First, in the acquirer 20A, a buffer (hereinafter, referred to as a morpheme string buffer) of a morpheme string is prepared in advance. Then, first, the acquirer 20A empties the morpheme string buffer (Step S300). Next, the acquirer 20A determines whether or not a result of speech recognition acquired from the speech recognition terminal 12 represents the end of speech (Step S302).

In a case where "No" is determined in Step S302 (Step S302: No), the process proceeds to Step S304. In Step S304, the acquirer 20A acquires a new morpheme (Step S304). Next, the acquirer 20A adds the new morpheme acquired in Step S304 to the end of the morpheme string buffer (Step S306).

Next, the divider 20B determines whether or not a total time length of the morpheme string stored in the morpheme string buffer is a threshold $T_2^S$ or more (Step S308). In a case where "No" is determined in Step S308 (Step S308: No), the process is returned to Step S304. On the other hand, in a case where "Yes" is determined in Step S308 (Step S308: Yes), the process proceeds to Step S310.

In Step S310, the divider 20B sets the morpheme string stored in the morpheme string buffer as target sentence data 30 and finds a division position k satisfying the relations of Expression (4) and Inequality (5) described above (Step S310).

Then, the divider 20B deletes the morpheme string of up to the division position k found in Step S310 from the first morpheme stored in the morpheme string buffer from the morpheme string buffer (Step S312) and adds the morpheme string to the end of the correction segment list 36 (Step S314). Then, the process is returned to Step S304.

On the other hand, in a case where "Yes" is determined in Step S302 (Step S302: Yes), the process proceeds to Step S316. In Step S316, the divider 20B adds the morpheme string remaining in the morpheme string buffer to the end of the correction segment list 36 (Step S316). Then, this process ends.

Figure 13:
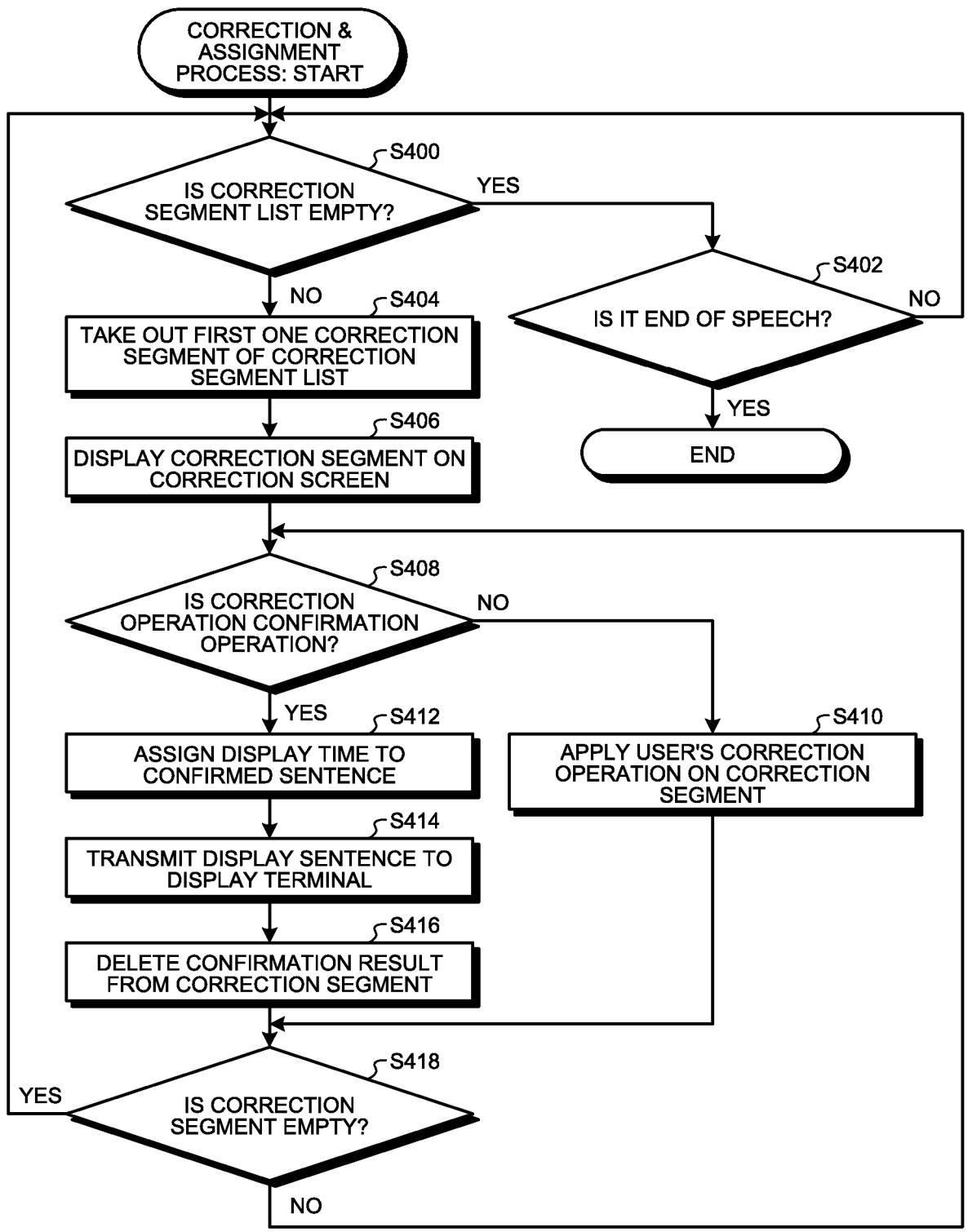
FIG. 13 is a flowchart of the sequence of a correction & assignment process.

Next, the correction & assignment process (Step S112 illustrated in FIG. 10) will be described. FIG. 13 is a flowchart that illustrates an example of the sequence of the correction & assignment process (see Step S112 illustrated in FIG. 10).

First, the corrector 20C determines whether or not the correction segment list 36 is empty (Step S400). In a case where "No" is determined in Step S400 (Step S400: No), the process proceeds to Step S404.

In Step S404, the corrector 20C takes out one correction segment 32 disposed at the start of the correction segment list 36 (Step S404). Then, the corrector 20C displays the correction segment 32 taken out in Step S404 on the UI unit 24 through the display controller 20F (Step S406). As described above, the correction screen 40 including the correction segment 32 is displayed on the UI unit 24.

Next, the corrector 20C determines whether or not the type of correction operation input according to a user's operation from the UI unit 24 through the receiver 20G is "confirmation" (Step S408). In a case where "No" is determined in Step S408 (Step S408: No), the user's correction operation is applied on the correction segment 32 so as to be a confirmed sentence 34 (Step S410), and the process proceeds to Step S418. On the other hand, in a case where "Yes" is determined in Step S408 (Step S408: Yes), the process proceeds to Step S412.

In Step S412, the assigner 20D assigns display time to the confirmed sentence 34 confirmed in Step S408 and Step S410 (Step S412).

Next, the output unit 20E transmits the confirmed sentence 34 to which the display time is assigned in Step S412 to the display terminal 14 as a display sentence 37 (Step S414). The display terminal 14 that has received the display sentence 37 displays the confirmed sentence 34 included in the display sentence 37 on the display at the display time assigned to the confirmed sentence 34.

Next, the corrector 20C deletes a result of the confirmation confirmed in Step S408 from the correction segment 32 displayed in Step S406 (Step S416).

Next, the corrector 20C determines whether or not the correction has been completed for all the morphemes included in the correction segment 32 displayed in Step S406 (Step S418). In a case where "No" is determined in Step S418 (Step S418: No), the process is returned to Step S408. On the other hand, in a case where "Yes" is determined in Step S418 (Step S418: Yes), the process is returned to Step S400.

On the other hand, in a case where "Yes" is determined in Step S400 (Step S400: Yes), the process proceeds to Step S402. In Step S402, the acquirer 20A determines whether or not speech ends (Step S402). In a case where "No" is determined in Step S402 (Step S402: No), the process is returned to Step S400. On the other hand, in a case where "Yes" is determined in Step S402 (Step S402: Yes), this process ends.

Figure 14:
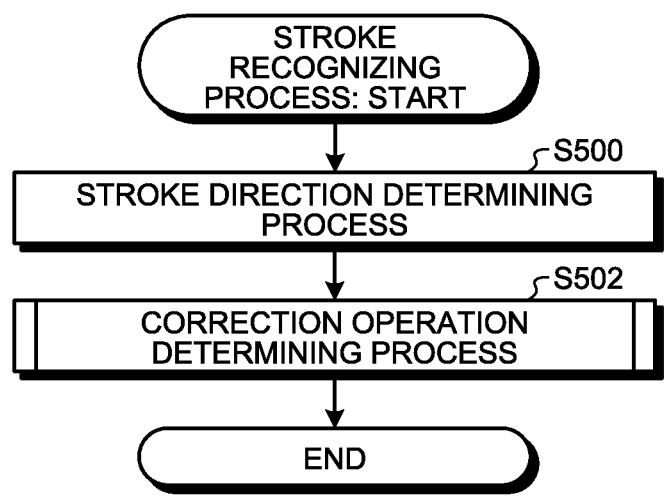
FIG. 14 is a flowchart of the sequence of a stroke recognizing process.

Next, an example of the sequence of a stroke S recognizing process performed by the corrector 20C will be described. FIG. 14 is a flowchart that illustrates an example of the sequence of the stroke recognizing process.

Here, a case will be described in which the corrector 20C acquires a set (referred to as a stroke point sequence) of points along the trajectory acquired until, for example, a pen or the like is separated away from an input surface after being brought into contact with the input surface, as the stroke S. First, the corrector 20C performs a stroke point sequence direction determining process by using the stroke point sequence (Step S500).

In Step S500, the corrector 20C acquires a direction between feature points adjacent to a row of feature points (feature point row) in the stroke point sequence. As the directions between feature points, for example, there are eight kinds of Up, UpRight, Right, RightDown, Down, DownLeft, Left, and UpLeft.

In other words, in this case, the corrector 20C recognizes a stroke formed by continuation of straight lines of eight directions. In addition, a process of changing the type of stroke in accordance with the length, determining a circular-shape stroke, and the like may be further performed.

First, the corrector 20C performs smoothing of the stroke point sequence. Described in more details, the corrector 20C interpolates the points such that a distance between adjacent points configuring the stroke point sequence is constant. Then, the corrector 20C calculates the curvature for each point in the stroke point sequence after the smoothing.

For example, the corrector 20C acquires Equation (11) by using the following Equations (8) to (10), thereby calculating the curvature of each point.

Difference between point $p_i^f$ and $p_{i-2}^f$:  (8)
$$d_i^- = p_{i-2}^f \cdot y - p_i^f \cdot y / p_{i-2}^f \cdot x - p_i^f \cdot x$$

Difference between point $p_{i+2}^f$ and $p_i^f$:  (9)
$$d_i^+ = p_i^f \cdot y - p_{i+2}^f \cdot y / p_i^f \cdot x - p_{i+2}^f \cdot x$$

Difference between point $p_{i+1}^f$ and $p_{i-1}^f$:  (10)
$$d_i^{\pm} = p_{i-1}^f \cdot y - p_{i+1}^f \cdot y / p_{i-1}^f \cdot x - p_{i+1}^f \cdot x$$

$$c_i = d_i^+ - d_i^- / (1 + d_i^{\pm 2})^{\frac{3}{2}}$$  (11)

In Equations (8) to (11), $d_i^-$, $d_i^+$, and $d_i^{\pm}$ represent three coordinate value differences having a point $p_i^f$ on a curvature calculation target as the center. In Equations (8) to (10), $p_i^f$ represents a point in a stroke point sequence after smoothing; $p_{i-1}^f$ represents another point positioned near the upstream side in a running direction with respect to the point $p_i^f$; $p_{i-2}^f$ represents another point positioned near the upstream side in the running direction with respect to the point $p_i^f$; $p_{i+1}^f$ represents another point positioned near the downstream side in the running direction with respect to the point $p_i^f$; and $p_{i+2}^f$ represents another point positioned near the downstream side in the running direction with respect to the point $p_i^f$. Here, the running direction represents a direction in which a stroke is drawn. In addition, in Equation (11), $c_i$ represents the curvature of the point $p_i^f$.

Next, the corrector 20C specifies points having a high curvature, in other words, points at which the stroke S greatly curved among points configuring the stroke point sequence after smoothing as feature points. For example, the corrector 20C specifies a point positioned at a start point of the stroke point sequence, points having curvatures greater than a threshold, and a point positioned at an end point as feature points.

In addition, in a case where a point row at which subscripts are continuous is included in specified points, the corrector 20C specifies only a point having a greatest curvature in the point row as a feature point.

Next, the corrector 20C determines a direction between the feature points and acquires the direction of the stroke. For example, the corrector 20C, for each feature point, derives an angle of a segment joining the feature point and another feature point adjacent to the feature point by using an arc tangent function. Then, the corrector 20C determines one of the directions of the eight types described above in which the derived angle is included. In this way, the corrector 20C acquires directions between the feature points. In a case where the same direction is continued before and after a feature point, the feature point may be deleted.

In this way, the corrector 20C acquires directions between the feature points adjacent to the feature point row as the directions of the stroke.

Next, the corrector 20C performs a correction operation determining process (Step S502). Then, this process ends.

The correction operation determining process is a process of determining the type of correction operation ("deletion", "insertion", "substitution", or "confirmation").

Figure 15:
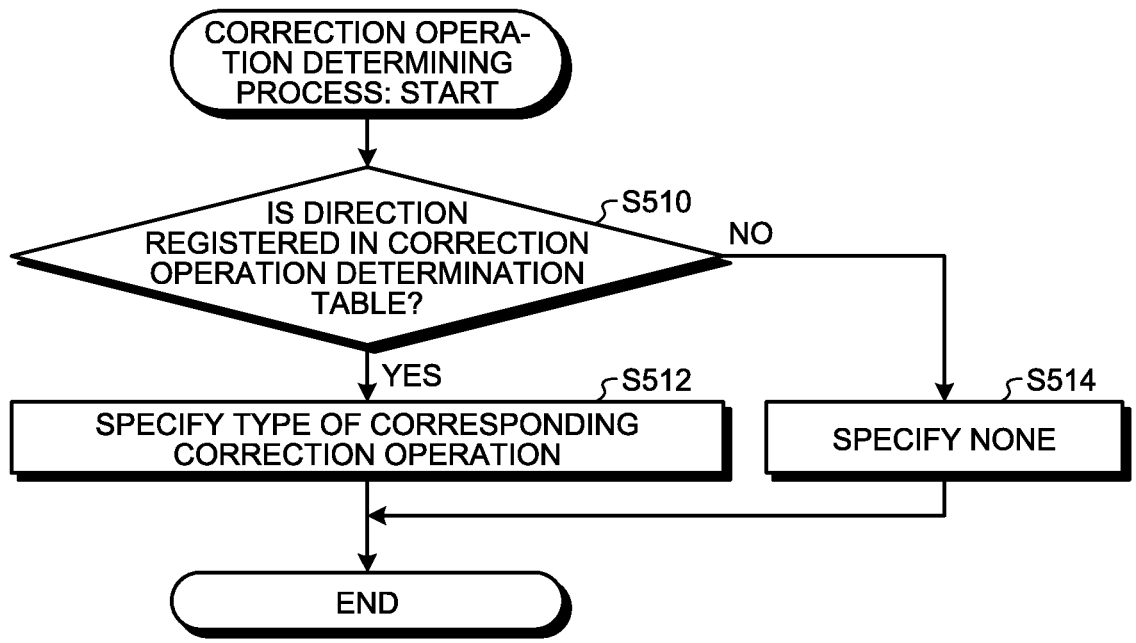
FIG. 15 is a flowchart of the sequence of a correction operation determining process.

FIG. 15 is a flowchart that illustrates an example of the sequence of the correction operation determining process.

The corrector 20C, for each type of correction operation, a direction between feature points and a target point that is a target for a correction operation are stored in a correction operation determination table in association with each other in advance.

Then, the corrector 20C determines whether or not the direction between feature points acquired in Step S500 is registered in the correction operation determination table (Step S510).

In a case where "Yes" is determined in Step S510 (Step S510: Yes), the process proceeds to Step S512. In Step S512, the corrector 20C specifies a type of correction operation corresponding to the direction between the feature points in the correction operation determination table, which is determined in Step S510, as the type of correction operation represented by the stroke S (Step S512). Then, this process ends.

For example, it is assumed that a feature point row $P_{dir}$ acquired by the process of Step S500 is $P_{dir}$={(100, 100), (200, 115), (218, 163)}, and the direction D is D =(Right, Down). In addition, it is assumed that "substitution" is registered in the correction operation determination table as the type of correction operation corresponding to this direction D=(Right, Down), and a target point (0, 1) is registered. In this case, the corrector 20C specifies the type of correction operation as "substitution". In addition, the corrector 20C specifies a target coordinate row $P_{target}$ of the correction operation as $P_{target}$={(100, 100), (200, 115)}.

On the other hand, in a case where "No" is determined in Step S510 (Step S510: No), the process proceeds to Step S514. In Step S514, it is determined that there is no corresponding type of correction operation (Step S514), and this process ends.

In addition, in the example illustrated in FIG. 15, the corrector 20C determines whether or not the direction between the feature points is registered in the correction operation determination table, in other words, determines whether or not a direction that completely coincides with the direction between the feature points is registered in the correction operation determination table. However, the corrector 20C may perform the determination described above by describing a direction to be registered in the correction operation determination table in a regular expression and finding a row matching the direction from the correction operation determination table. By using such a method, a robust correction operation determining process can be performed.

As described above, the information processing apparatus 10 according to this embodiment includes the acquirer 20A and the assigner 20D. The acquirer 20A acquires target sentence data 30 including a plurality of morphemes acquired through speech recognition and speech generation time of each morpheme from the plurality of morphemes. The assigner 20D assigns display time according to a difference (speech generation time difference) between a confirmed sentence 34 of the target sentence data 30 of which the user's correction is confirmed and another confirmed sentence 34 of the previous speech generation time.

In this way, according to this embodiment, the information processing apparatus 10 assigns display time according to a speech generation time difference of the speech generation time to the confirmed sentence 34.

For this reason, according to the information processing apparatus 10 of this embodiment, the display time can be assigned such that the display of a subtitle according to a confirmed sentence 34 spoken at the next timing before or in the middle of user's recognition of a subtitle according to a confirmed sentence 34 is suppressed. In addition, the information processing apparatus 10 of this embodiment can assign the display time such that a subtitle corresponding to a content spoken by a speaker for a longer time is displayed for a longer period. For this reason, by displaying the confirmed sentence 34 according to the display time, the information processing apparatus 10 can provide a subtitle of the speech at timing when the subtitle can be easily read.

Therefore, according to the information processing apparatus 10 of this embodiment, the subtitle of speech can be provided at timing when the subtitle can be easily read.

In addition, since the display time is assigned to a confirmed sentence 34 corresponding to the correction segment 32, the user's processing load at the time of correcting the correction segment 32 can be decreased.

In addition, in the information processing system 100 of this embodiment, a case is illustrated in which the speech recognition terminal 12, the information processing apparatus 10, and the display terminal 14 are separately configured. However, at least two or more of the speech recognition terminal 12, the information processing apparatus 10, and the display terminal 14 may be integrally configured.

Modified Example 1

In the embodiment described above, a case has been illustrated in which the assigner 20D assigns the display time to a confirmed sentence 34.

However, the assigner 20D may assign display time to a connected confirmed sentence acquired by connecting a plurality of confirmed sentences 34 adjacent to each other.

In such a case, first, the assigner 20D calculates a connection score for each confirmed sentence 34. Here, the connection score is a value representing the degree of easiness in being connected to another adjacent confirmed sentence 34 as a sentence. A higher connection score represents being easily connected as a sentence. Then, in a case where the connection score is a threshold or more, the assigner 20D assigns display time to a confirmed sentence 34 and a connected confirmed sentence acquired by connecting the confirmed sentence 34 to another confirmed sentence 34.

For example, the assigner 20D calculates a punctuation mark score for a confirmed sentence 34 (i-th confirmed sentence 34) that is a target for the calculation of a connection score. Here, the punctuation mark score is a value indicating whether or not the i-th confirmed sentence 34 ends with a punctuation mark. The punctuation mark score, for example, is represented using the following Equation (12).

$$p'_i = \begin{cases} 2 & \text{if } w^j_{ni} \text{ ends at period} \\ 1 & \text{if } w^j_{ni} \text{ ends at comma} \\ 0 & \text{otherwise} \end{cases} \quad (12)$$

In Equation (12), $P'_i$ represents the punctuation mark score of the i-th confirmed sentence 34; and $w_{ni}{}^i$ represents a morpheme, which is included in the i-th confirmed sentence 34, positioned last.

Then, the assigner 20D calculates the connection score of the i-th confirmed sentence 34 by using the following Equation (13).

$$\text{Continuation score } S^c = a \times p_{i-1}' b \times (t^{b,i}_1 - t^{e,i-1}_{ni-1}) + c \times (t^{e,i}_{ni} - t^{b,j}_m) \quad (13)$$

In Equation (13), $(t^{b,i}_1 - t^{e,i-1}_{ni-1})$ represents a time difference (a difference between start time corresponding to a first morpheme of the previous connected confirmed sentence and start time corresponding to a first morpheme included in the i-th confirmed sentence 34) from the previous connected confirmed sentence. In addition, in Equation (13), $(t^{e,i}_{ni} - t^{b,j}_m)$ represents a total time length of a case where the previous connected confirmed sentence and the i-th confirmed sentence 34 are connected. In Equation (13), a, b, and c are coefficients set in advance.

Then, the assigner 20D determines whether or not the i-th confirmed sentence 34 is connected to the previous confirmed sentence 34 in accordance with the connection score by using the following Equation (14).

$$c_i = f(x) = \begin{cases} \text{true} & \text{if } S^c_i \geq C \\ \text{false} & \text{if } S^c_i < C \end{cases} \quad (14)$$

In Equation (14), $c_i$ is connection information representing whether or not being connected to the previous confirmed sentence 34. In addition, in Equation (14), $S_i^c$ represents the connection score of the i-th confirmed sentence 34, and C represents a constant.

In other words, in a case where the connection score is a threshold (constant C) or more, the assigner 20D assigns display time to the confirmed sentence 34 and a connected confirmed sentence acquired by connecting the confirmed sentence 34 to another confirmed sentence 34. Then, the assigner 20D, similarly to the first embodiment, may assign display time to each connected confirmed sentence connected according to the connection score.

Figure 16A:
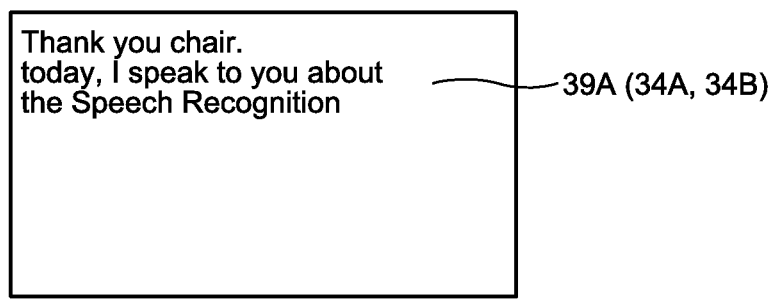
FIGS. 16A and 16B are schematic diagrams of display screens.
Figure 16B:
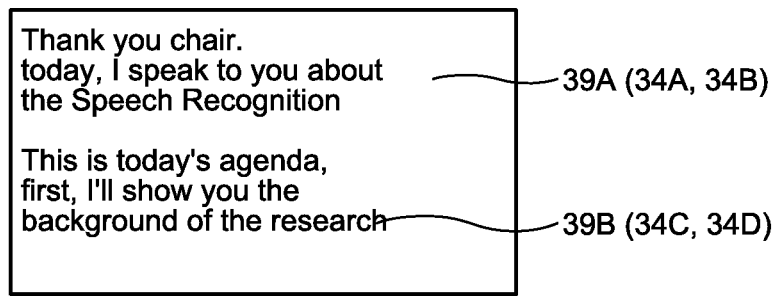

FIGS. 16A and 16B are schematic diagrams that illustrate an example of the display screen displayed on the display of the display terminal 14.

For example, the display terminal 14 displays a connected confirmed sentence 39A of a confirmed sentence 34A "Thank you chair." and a confirmed sentence 34B "today, I speak to you about the Speech Recognition" in accordance with the display time assigned to the connected confirmed sentence 39A (FIG. 16A).

Then, the display terminal 14 scrolls the connected confirmed sentence 39A and displays a connected confirmed sentence 39B of a confirmed sentence 34C and a confirmed sentence 34D in accordance with the display time assigned to the connected confirmed sentence 39B (FIG. 16B).

For this reason, according to the information processing apparatus 10 of this modified example, in addition to the effects of the embodiment described above, subtitles can be provided in units that can be more easily read as a sentence.

Modified Example 2

In the embodiment described above, a case has been described in which the assigner 20D assigns display time according to a speech generation time difference of speech generation time to a confirmed sentence 34, of which the correction is confirmed, corresponding to the correction segment 32 of the target sentence data 30.

However, the assigner 20D may assign display time according to a speech generation time difference and a correction time for the correction segment 32 to the confirmed sentence 34.

Here, the correction time for the correction segment 32 is a time required for the correction of the correction segment 32. Described in more details, the correction time for the correction segment 32 is a period until a correction is confirmed (until confirmation time) according to a user's correction operation for the correction segment 32 after the corrector 20C displays the correction segment 32 that is a correction target on the UI unit 24.

The assigner 20D, as described above, assigns display time having a larger difference from the confirmation time of a confirmed sentence 34 to the confirmed sentence 34 as a speech generation time difference of the correction segment 32 corresponding to the confirmed sentence 34 increases. Then, in this modified example, furthermore, the assigner 20D assigns display time having a decreasing difference from the confirmation time of a confirmed sentence 34 to the confirmed sentence 34 as the correction time of the correction segment 32 corresponding to the confirmed sentence 34 increases.

More specifically, the assigner 20D may calculate the display time by using the following Equation (15).

$$V_i^{Ri} = f(t^{Ri} - t^{Ri-1}) \quad (15)$$

$$f(x) = \begin{cases} ax & \text{if } h \leq H \\ bx & \text{if } h > H \end{cases} \quad (16)$$

In Equation (15), $V^{Ri}$ represents display time assigned to the i-th confirmed sentence 34. In addition, $(t^{Ri} - t^{Ri-1})$ represents a difference between the start time of the i-th confirmed sentence Ri and the start time of the previous (i−1)-th confirmed sentence Ri−1. In Equation (16), a and b are coefficients set in advance. In Equation (16), h represents a correction time, and H represents a threshold. In addition, relations of H>0.1>a>b>0 are represented.

In other words, by using Equation (15) described above, in a case where the correction time increases than a threshold H set in advance (in other words, it takes time to perform the correction), the assigner 20D assigns display time having a decreasing difference to the confirmed sentence 34 than that of a case where the correction time is the threshold H or less (in other words, it takes no time to perform the correction).

For this reason, according to the information processing apparatus 10 of this modified example, in addition to the effects of the embodiment described above, a long delay of the display of a corresponding subtitle in a case where it takes time to correct a confirmed sentence 34 can be suppressed.

Modified Example 3

In the embodiment described above, the assigner 20D has been described to assign display time according to a speech generation time difference of speech generation time to a confirmed sentence 34. In addition, a case has been described in which the speech generation time difference is a difference between the start time of a first morpheme included in the confirmed sentence 34 and the start time of a first morpheme included in the another confirmed sentence 34 that is the previous confirmed sentence.

However, the speech generation time difference is not limited to the form described above. For example, the speech generation time difference may be a difference between the start time (speech generation start time) of a morpheme having earliest speech generation time included in another confirmed sentence 34 having the previous speech generation time and the end time (speech generation end time) of a morpheme having latest speech generation time.

Figure 17A:
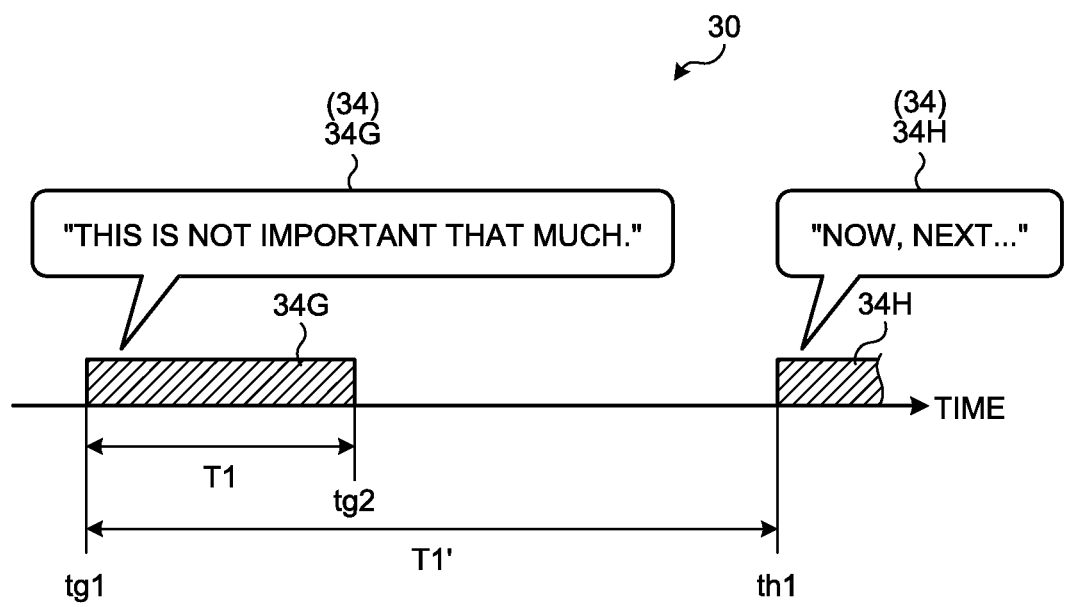
FIGS. 17A and 17B are explanatory diagrams of speech generation time differences.
Figure 17B:
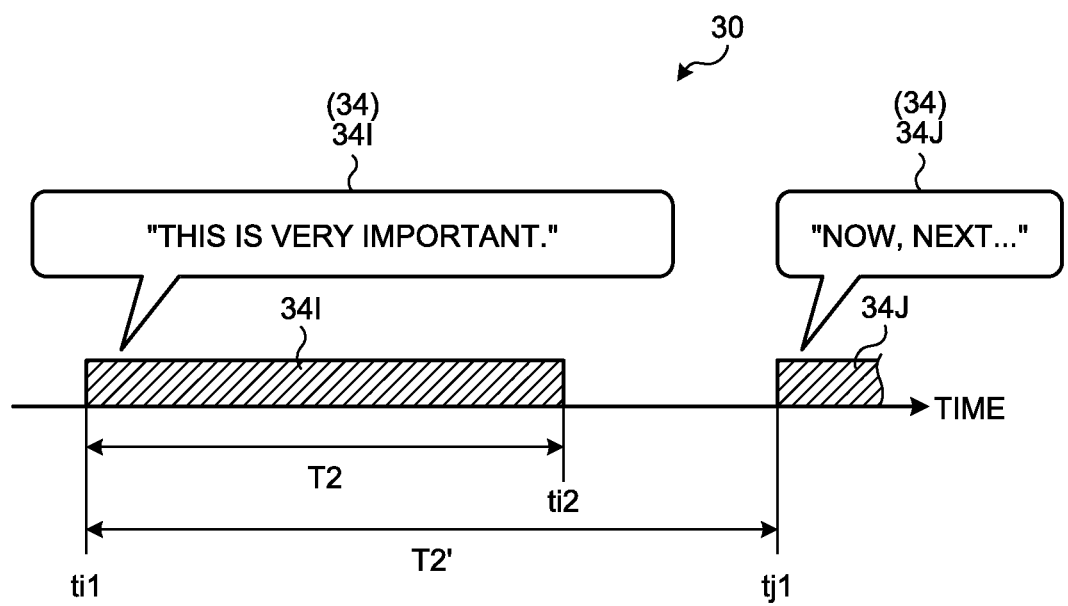

FIGS. 17A and 17B are explanatory diagrams that illustrate examples of the speech generation time difference. For example, it is assumed that a confirmed sentence 34G and a confirmed sentence 34H are arranged in target sentence data 30 in a time series. Then, it is assumed to be in a stage in which the assigner 20D assigns display time to the confirmed sentence 34H.

FIG. 17A is a schematic diagram that illustrates an example of target sentence data 30 of a case where, after speech generation (confirmed sentence 34G) is performed for a short period at a high speech generation speed, next speech generation (confirmed sentence 34H) is performed with a long interval. In addition, FIG. 17B is a schematic diagram that illustrates an example of target sentence data 30 of a case where, after speech generation (confirmed sentence 34I) is performed for a short period at a low speech generation speed, next speech generation (confirmed sentence 34J) is performed with a short interval.

In a case where the target sentence data 30 illustrated in FIG. 17A is processed, in the embodiment described above, the assigner 20D uses a time difference T1' between the start time th1 of a morpheme having earliest speech generation time in the confirmed sentence 34H and the start time tg1 of a morpheme having earliest speech generation time in the previous confirmed sentence 34G as a speech generation time difference. Then, the assigner 20D assigns speech generation time according to the speech generation time difference of this time difference T1' to the confirmed sentence 34H.

In addition, in a case where the target sentence data 30 illustrated in FIG. 17B is processed, in the embodiment described above, the assigner 20D uses a time difference T2' between the start time tj1 of a morpheme having earliest speech generation time in the confirmed sentence 34J and the start time ti1 of a morpheme having earliest speech generation time in the previous confirmed sentence 34I as a speech generation time difference. Then, the assigner 20D assigns speech generation time according to the speech generation time difference of this time difference T2' to the confirmed sentence 34J.

On the other hand, in this modified example, in a case where the target sentence data 30 illustrated in FIG. 17A is processed, the assigner 20D uses a time difference T1 between the start time tg1 of a morpheme having earliest speech generation time in the previous confirmed sentence 34G and the end time tg2 of a morpheme having latest speech generation time in the confirmed sentence 34G as a speech generation time difference. Then, the assigner 20D assigns speech generation time according to the speech generation time difference of this time difference T1 to the confirmed sentence 34H.

In addition, in this modified example, in a case where the target sentence data 30 illustrated in FIG. 17B is processed, the assigner 20D uses a time difference T2 between the start time ti1 of a morpheme having earliest speech generation time in the previous confirmed sentence 34I and the end time ti2 of a morpheme having latest speech generation time in the confirmed sentence 34I as a speech generation time difference. Then, the assigner 20D assigns speech generation time according to the speech generation time difference of this time difference T2 to the confirmed sentence 34J.

In this way, the assigner 20D may assign speech generation time to the confirmed sentence 34 by using the difference between the start time (speech generation start time) of a morpheme having earliest speech generation time included in another confirmed sentence 34 having the previous speech generation time and the end time (speech generation end time) of a morpheme having latest speech generation time as a speech generation time difference.

By using such a speech generation time difference, in a case where another confirmed sentence 34 having the previous speech generation time is spoken for a long period at a low speech generation speed, the assigner 20D can assign later display time to a confirmed sentence 34 of the next speech generation time. In other words, the assigner 20D can assign display time for displaying the previous confirmed sentence 34 spoken for a long period at a low speech generation speed for a longer period to the next confirmed sentence 34.

In addition, in a case where another confirmed sentence 34 of the previous speech generation time is spoken for a short time at a high speech generation speed, the assigner 20D can assign earlier display time to a confirmed sentence 34 of the next speech generation time. In other words, the assigner 20D can assign display time for displaying the previous confirmed sentence 34 spoken for a long period at a high speech generation speed for a shorter period to the next confirmed sentence 34.

For this reason, the information processing apparatus 10 according to this modified example can assign display time according to the speech speed of the speaker and can provide a subtitle that delivers the intention of the speaker more accurately in addition to the effects of the first embodiment.

Second Embodiment

In this embodiment, a case will be described in which blank information representing a period (space period) in which speech is not recognized is inserted into a correction segment 32.

Figure 18:
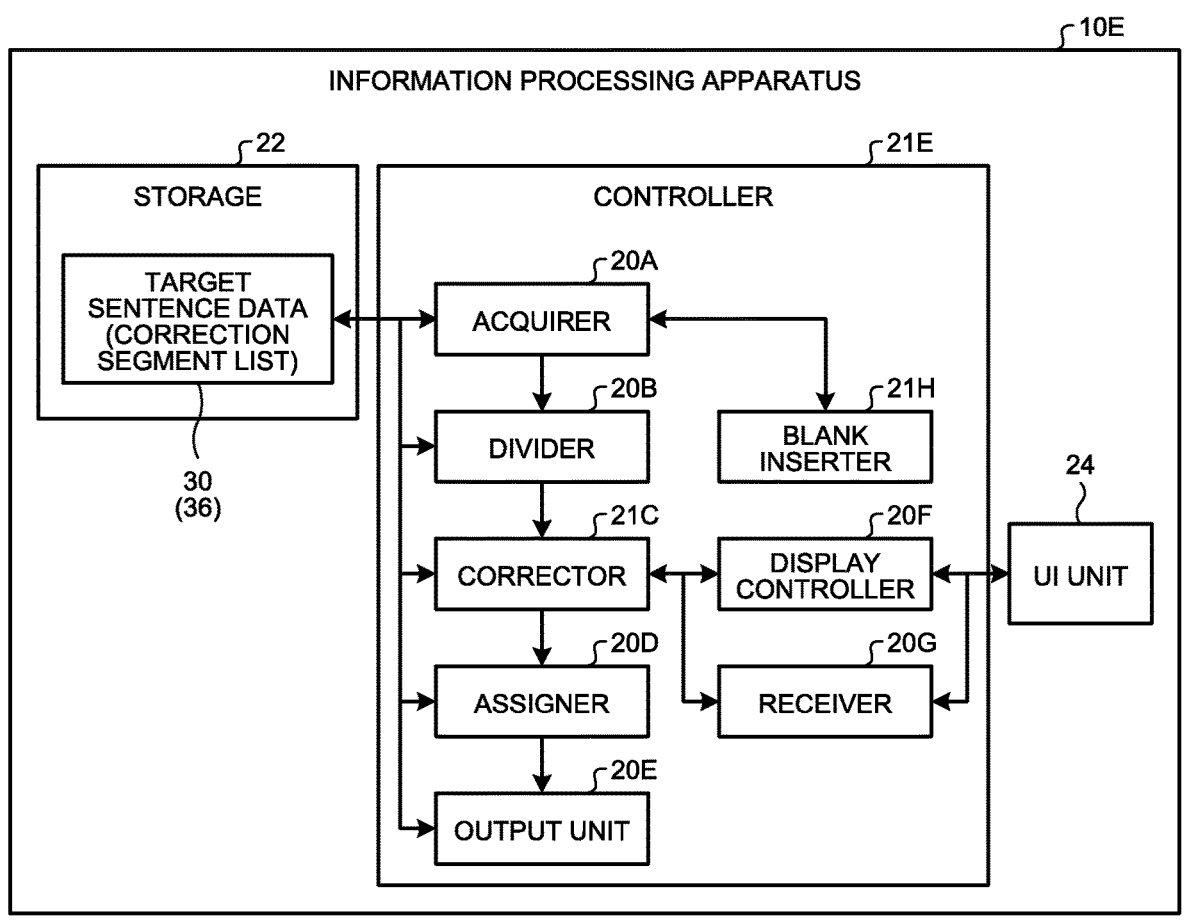
FIG. 18 is a functional block diagram of an information processing apparatus.

FIG. 18 is an example of a functional block diagram of an information processing apparatus 10E according to this embodiment.

The information processing apparatus 10E is similar to that according to the first embodiment except for the inclusion of a blank inserter 21H. In this embodiment, the same reference numeral will be assigned to a configuration of a function similar to that of the embodiment described above, and detailed description thereof will not be presented.

In a case where a blank period in which speech is not recognized is included in the correction segment 32, the blank inserter 21H inserts blank information representing a blank period. In a case where the blank period is determined to be a predetermined threshold or more by using the speech generation time (start time, end time) of each morpheme included in the correction segment 32, blank information representing a blank period is generated. The blank information may be information representing that no speech is recognized or information representing that any of speakers does not talk.

The corrector 21C uses the correction segment 32 into which the blank information is inserted as a confirmed sentence 34.

For this reason, in a case where the blank information is included in the confirmed sentence 34, the blank information is displayed as a subtitle.

Figure 19:
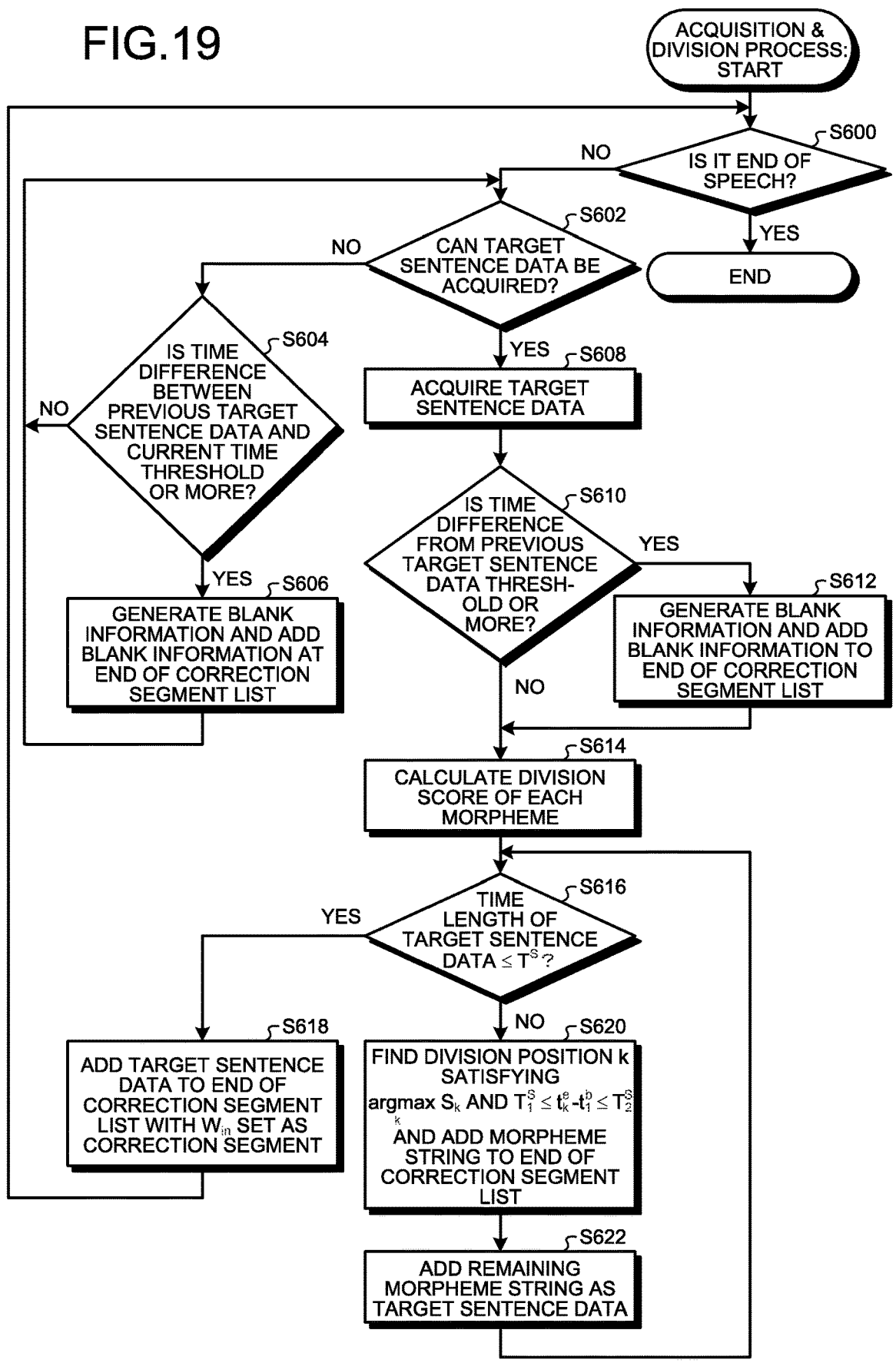
FIG. 19 is an explanatory diagram of an acquisition & division process.

Next, a controller 21E of the information processing apparatus according to this embodiment performs a process illustrated in FIG. 19 in the process of Step S110 illustrated in FIG. 10.

FIG. 19 is an explanatory diagram that illustrates an example of an acquisition & division process performed by the controller 21E. In addition, it is assumed that speech-recognized morphemes are sequentially transmitted from a speech recognition terminal 12 to the information processing apparatus 10E together with speech generation time.

First, the acquirer 20A sequentially acquires results of speech recognition from the speech recognition terminal 12. Then, the acquirer 20A determines whether or not an acquired result of speech recognition represents the end of speech (Step S600). The process of Step S600 is similar to that according to the first embodiment (see Step S200 illustrated in FIG. 11).

In a case where "Yes" is determined in Step S600 (Step S600: Yes), the process ends. On the other hand, in a case where "No" is determined in Step S600 (Step S600: No), the process proceeds to Step S602. In Step S602, it is determined whether or not the acquirer 20A can acquire target sentence data 30 (Step S602).

In a case where "No" is determined in Step S602 (Step S602: No), the process proceeds to Step S604. In Step S604, the blank inserter 21H determines whether or not a time difference between target sentence data 30 that is previously acquired and the current time is a threshold or more (Step S604). As this threshold, a predetermined value may be set.

In a case where "Yes" is determined in Step S604 (Step S604: Yes), the process proceeds to Step S606. In Step S606, the blank inserter 21H generates blank information and adds the generated blank information to the end of a correction segment list 36 as a correction segment 32 (Step S606). Then, the process is returned to Step S602 described above. On the other hand, in a case where "No" is determined in Step S604 (Step S604: No), the process is returned to Step S602.

On the other hand, in a case where "Yes" is determined in Step S602 (Step S602: Yes), the process proceeds to Step S608. In Step S608, the acquirer 20A acquires target sentence data 30 (Step S608).

Next, the blank inserter 21H determines whether or not a time difference between the target sentence data 30 that is previously acquired and the target sentence data 30 acquired in this Step S602 is a threshold or more (Step S610). As this threshold, a predetermined value may be set. In addition, it is preferable that the threshold used in Step S610 is smaller (decreasing) than the threshold used in Step S604.

In a case where "Yes" is determined in Step S610 (Step S610: Yes), the process proceeds to Step S612. In Step S612, the blank inserter 21H generates blank information and adds the generated blank information to the end of the correction segment list 36 as a correction segment 32 (Step S612). Then, the process proceeds to Step S614. Also in a case where "No" is determined in Step S610 (Step S610: No), the process proceeds to Step S614.

Then, the controller 21E performs the process of Steps S614 to S622. The process of Steps S614 to S622 is similar to that of Steps S204 to S212 according to the first embodiment illustrated in FIG. 11.

As described above, according to the information processing apparatus 10E of this embodiment, in a case where a blank period in which speech is not recognized is included, the blank inserter 21H inserts the blank information representing a blank period into the correction segment 32.

Therefore, according to the information processing apparatus 10E of this embodiment, in a case where the blank information is included in a confirmed sentence 34, the blank information is displayed as a subtitle, and accordingly, the intention of the speaker and the atmosphere in the middle of speech generation can be provided as subtitles in addition to the effects of the embodiment described above.

Third Embodiment

In this embodiment, a case will be described in which a limit time is arranged in a correction operation.

FIG. 2 is an example of a functional block diagram of an information processing apparatus 10F according to this embodiment.

In this embodiment, in case where a correction time of the correction segment 32 is the correction limit time, the corrector 101C has an additional function of setting time at which it becomes the correction limit time as confirmation time of a confirmed sentence 34 corresponding to the correction segment 32. Functions other than the additional function of the corrector 101C are similar to those according to the first embodiment. The same reference numeral will be assigned to the configuration of a function similar to that according to the embodiment described above, and detailed description thereof will not be presented.

The correction limit time is represented as an elapsed time from display start time Td1 of the correction segment 32 displayed on the UI unit 24. As the correction limit time, an arbitrary value may be set in advance.

The corrector 101C uses a correction content at time when the correction time becomes the correction limit time as a confirmed sentence 34 of the correction segment 32. In addition, the corrector 101C uses time when it is the correction limit time as confirmation time of the confirmed sentence 34.

In addition, the information processing apparatus 10F may use two kinds of correction limit times of which the count start times are different from each other. For example, the information processing apparatus 10F may use a first correction limit time and a second correction limit time as the correction limit time. The first correction limit time is represented as an elapsed time from the display start time Td1. The second correction limit time is represented as an elapsed time from operation start time Td2 at which a user's correction operation is started for the correction segment 32 displayed on the UI unit 24.

As the first correction limit time and the second correction limit time, arbitrary values may be set in advance. However, it is preferable that the first correction limit time decreases than the second correction limit time. By setting as such, in the information processing apparatus 10F, also in a case where a time during which a user does not perform any correction is long, the subtitle of the confirmed sentence 34 can be displayed on the display terminal 14 with a shorter delay time. In addition, in a case where a user performs a correction operation, the information processing apparatus 10F can allow the user to continue the correction operation by allowing a delay of some degree.

In addition, the corrector 101C performs control of a display controller 101F such that information representing a correction limit time is displayed on the UI unit 24 together with the correction segment 32. In other words, the display controller 101F displays a correction screen 40 including the correction segment 32 and the correction limit time of the correction segment 32 on the UI unit 24 (a display).

FIGS. 20A to 20G are schematic diagrams that illustrate an example of the correction screen 40. As described in the embodiment described above, on the correction screen 40, a confirmation area 41A and a correction area 41B are arranged (see FIGS. 5A to 5F). In the confirmation area 41A, a confirmed sentence 34 is displayed, and a correction segment 32 is displayed in the correction area 41B.

In this embodiment, the display controller 101F displays a correction screen 40 additionally including a correction limit time. In addition, it is preferable that the display controller 101F displays the correction screen 40 including a correction limit time and a remaining time until the correction limit time.

For example, the display controller 101F displays time bars 42 representing a correction limit time and a remaining time until the correction limit time (see FIGS. 20A to 20D).

The time bar 42 represents a correction limit time using the whole length of the bar. In addition, in the example illustrated in FIG. 20A, the whole length of the time bar 42A represents a correction limit time, and black area BL represents a remaining time until the correction limit time, and a gray area GR represents an elapsed time from the display start time Td1 (see a correction screen 40H).

Figure 20A:
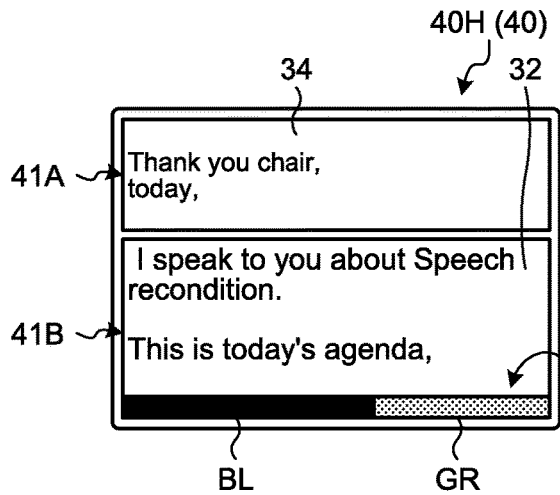
FIGS. 20A to 20G are schematic diagrams of correction screens.
Figure 20E:
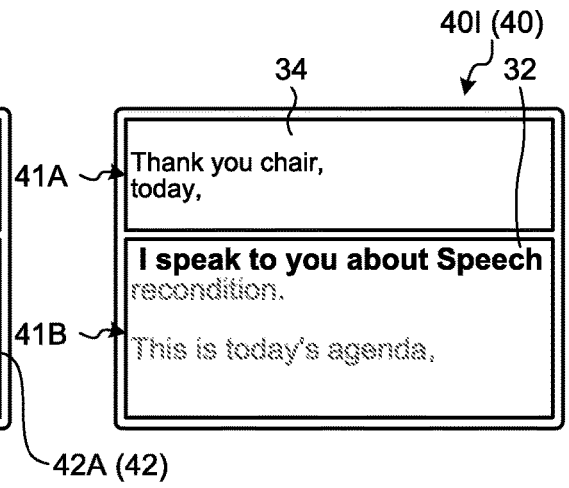
Figure 20B:
Figure 20C:
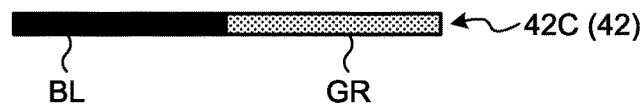
Figure 20D:
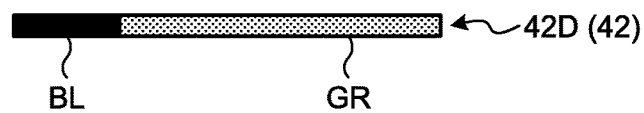

For this reason, immediately after the correction segment 32 is displayed on the UI unit 24, the display controller 101F displays a correction screen 40 including a time bar 42B representing the whole time bar 42 using a black area BL on the UI unit 24 (FIG. 20B). Then, in the middle of a user's correction operation, the display controller 101F, in accordance with an elapse of time from the display start time Td1, decreases a ratio occupied by the black area BL and increases a ratio occupied by the gray area GR. For this reason, the time bar 42 displayed on the UI unit 24 is changed as illustrated in FIGS. 20C and 20D (see a time bar 42C and a time bar 42D).

Then, when the whole time bar 42 becomes the gray area GR, in other words, when the elapsed time from the display start time Td1 coincides with the correction limit time, the corrector 101C determines that the correction of the correction segment 32 displayed in the correction area 41B is confirmed. Then, the corrector 101C may perform a process similar to that of the corrector 20C according to the first embodiment.

In addition, the display form of the correction limit time is not limited to the time bar 42. For example, the correction limit time and the remaining time until the correction limit time may be represented using the color of characters of the correction segment 32.

For example, as illustrated in FIG. 20E, the display controller 101F may change the color of the characters included in the correction segment 32 from a first color (for example, black) to a second color (for example, gray) in accordance with a decrease in the remaining time until the correction limit time (see a correction screen 40I).

In addition, according to a user's correction operation, there are cases where characters displayed in the correction area 41B are changed. For this reason, in a case where the color of characters is changed, the ratio of the number of characters of which the color is to be changed may be set in advance in accordance with the remaining time until the correction limit time. Then, the display controller 101F may display characters displayed in the correction area 41B at the ratio of the color of characters according to the remaining time until the correction limit time.

FIGS. 20A to 20G illustrate a case where morphemes are written in English as an example. However, the language of the morphemes is not limited to English. For example, the language of the morphemes may be Japanese.

The description will be continued by referring back to FIG. 2. As described above, there are cases where the information processing apparatus 10F uses two kinds of correction limit times (the first correction limit time and the second correction limit time) of which the count start times are different from each other.

In such cases, the information processing apparatus 10F may display a correction screen 40 including two kinds of correction limit times on the UI unit 24.

Figure 20F:
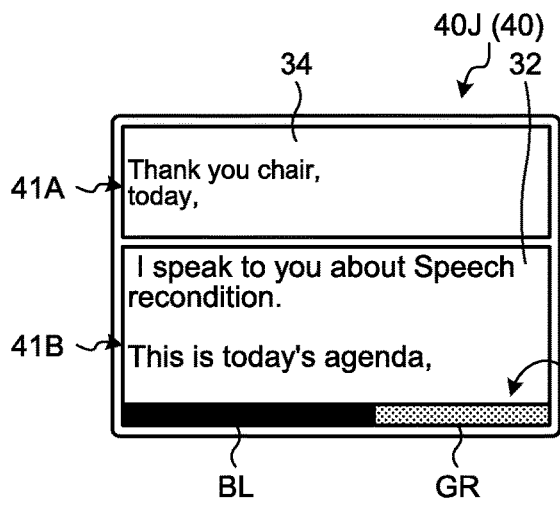
Figure 20G:
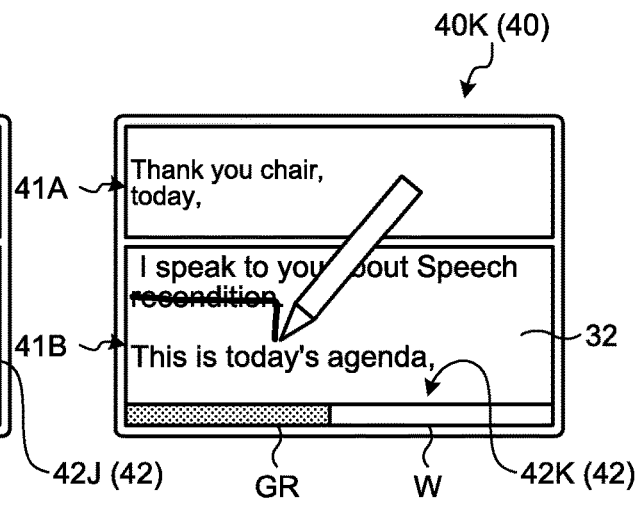

For example, as illustrated in FIGS. 20F and 20G, the display controller 101F may use two kinds of time bars 42 respectively corresponding to the first correction limit time and the second correction limit time.

In the example illustrated in FIG. 20G, a time bar 42J included in a correction screen 40J represents the first correction limit time using the whole length of the bar. In addition, in the example illustrated in FIG. 20G, the whole length of the time bar 42J represents the first correction limit time, a black area BL represents a remaining time until the first correction limit time, and a gray area GR represents an elapsed time from a display start time Td1.

In the example illustrated in FIG. 20G, a time bar 42K included in a correction screen 40K represents the second correction limit time using the whole length of the bar. In addition, in the example illustrated in FIG. 20G, the whole length of the time bar 42K represents the second correction limit time, a gray area GR represents a remaining time until the second correction limit time, and a white area W represents an elapsed time from a display start time Td2.

In this way, the display controller 101F may display the correction screen 40 including the correction limit time on the UI unit 24.

Next, an example of the sequence of information processing performed by the information processing apparatus 10F according to this embodiment will be described.

The controller 101A of the information processing apparatus 10F, similarly to the controller 20 according to the first embodiment, performs the process illustrated in FIG. 10. In addition, the controller 101A, in the correction & assignment process of Step S112 illustrated in FIG. 10, performs a process that is partially different from that according to the first embodiment.

Figure 21:
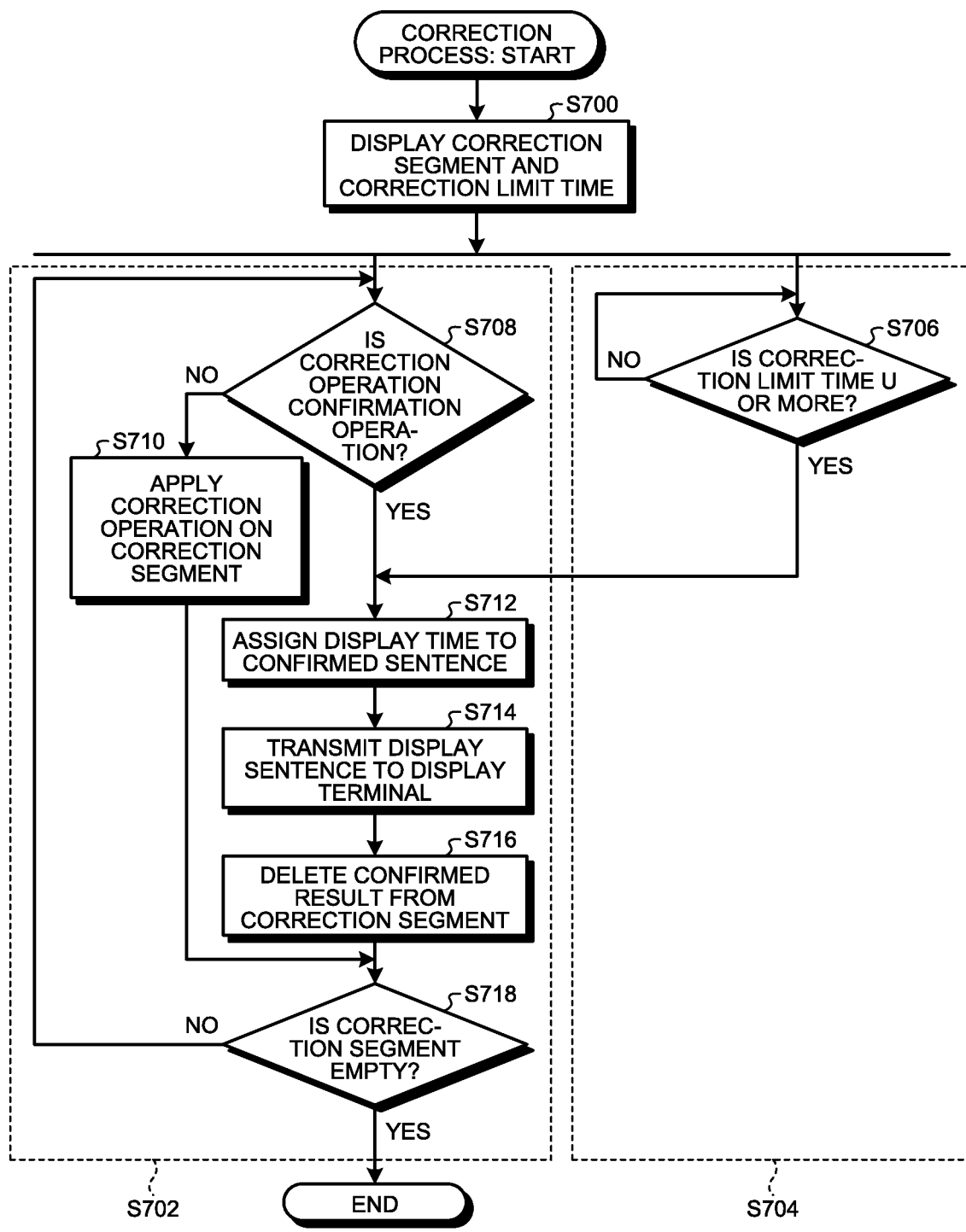
FIG. 21 is a flowchart of the sequence of a correction process.

The controller 101A, similarly to the controller 20 according to the first embodiment, instead of the process (referred to as a correction process) of Steps S406 to S418 illustrated in FIG. 13, performs a correction process illustrated in FIG. 21.

FIG. 21 is a flowchart that illustrates an example of the sequence of the correction process. FIG. 21 is a flowchart that illustrates an example of the sequence of the correction process in a case where there is only one kind of correction limit time. This correction limit time, as described above, is represented as an elapsed time from the display start time Td1 of the correction segment 32 displayed on the UI unit 24.

First, the corrector 101C displays a correction screen 40 including a correction segment 32 and a correction limit time on the UI unit 24 (Step S700). The corrector 101C maintains time when this correction segment 32 is displayed on the UI unit 24 as the display start time Td1.

Next, the controller 101A performs the process of Step S704 in the middle of execution of the process of Step S702 in parallel therewith.

The process of Step S702 includes the process of Steps S708 to S718. The process of Steps S708 to S718 is similar to that of Steps S408 to S418 (see FIG. 13) according to the first embodiment.

In other words, the corrector 101C determines whether or not the type of correction operation input according to a user's operation from the UI unit 24 through the receiver 20G is "confirmation" (Step S708). In a case where "No" is determined in Step S708 (Step S708: No), the process proceeds to Step S710. On the other hand, in a case where "Yes" is determined in Step S708 (Step S708: Yes), the process proceeds to Step S712.

In Step S712, the assigner 20D assigns display time to the confirmed sentence 34 confirmed in Step S708 (Step S712). Next, the output unit 20E transmits the confirmed sentence 34 to which the display time is assigned in Step S712 to the display terminal 14 as a display sentence 37 (Step S714). Next, the corrector 101C deletes result confirmed in Step S708 from the correction segment 32 displayed in Step S700 (Step S716).

Next, the corrector 101C determines whether or not the correction has been completed for all the morphemes included in the correction segment 32 displayed in Step S700 (Step S718). In a case where "No" is determined in Step S718 (Step S718: No), the process is returned to Step S708. On the other hand, in a case where "Yes" is determined in Step S718 (Step S718: Yes), the correction process ends.

Meanwhile, the controller 101A performs the process of Step S704 in the middle of execution of the process of Step S702 in parallel therewith.

The process of Step S704 includes a determination of Step S706. In Step S706, the corrector 101C determines whether or not an elapsed time from the display start time Td1 of the correction segment 32 displayed in Step S700 is the correction limit time U or more (Step S706). By determining whether or not a difference between the display start time Td1 and the current time is the correction limit time U or more, the corrector 101C performs the determination of Step S706.

The corrector 101C repeats the determination of "No" (Step S706: No) until "Yes" is determined in Step S706 (Step S706: Yes). Then, when "Yes" is determined in Step S706 (Step S706: Yes), the process proceeds to Step S712.

Next, the sequence of a correction process of a case where the information processing apparatus 10F uses the first correction limit time and the second correction limit time as the correction limit time will be described.

As described above, the first correction limit time is represented as an elapsed time from the display start time Td1. The second correction limit time is represented as an elapsed time from the operation start time Td2 when a user's correction operation is started for the correction segment 32 displayed on the UI unit 24.

Figure 22:
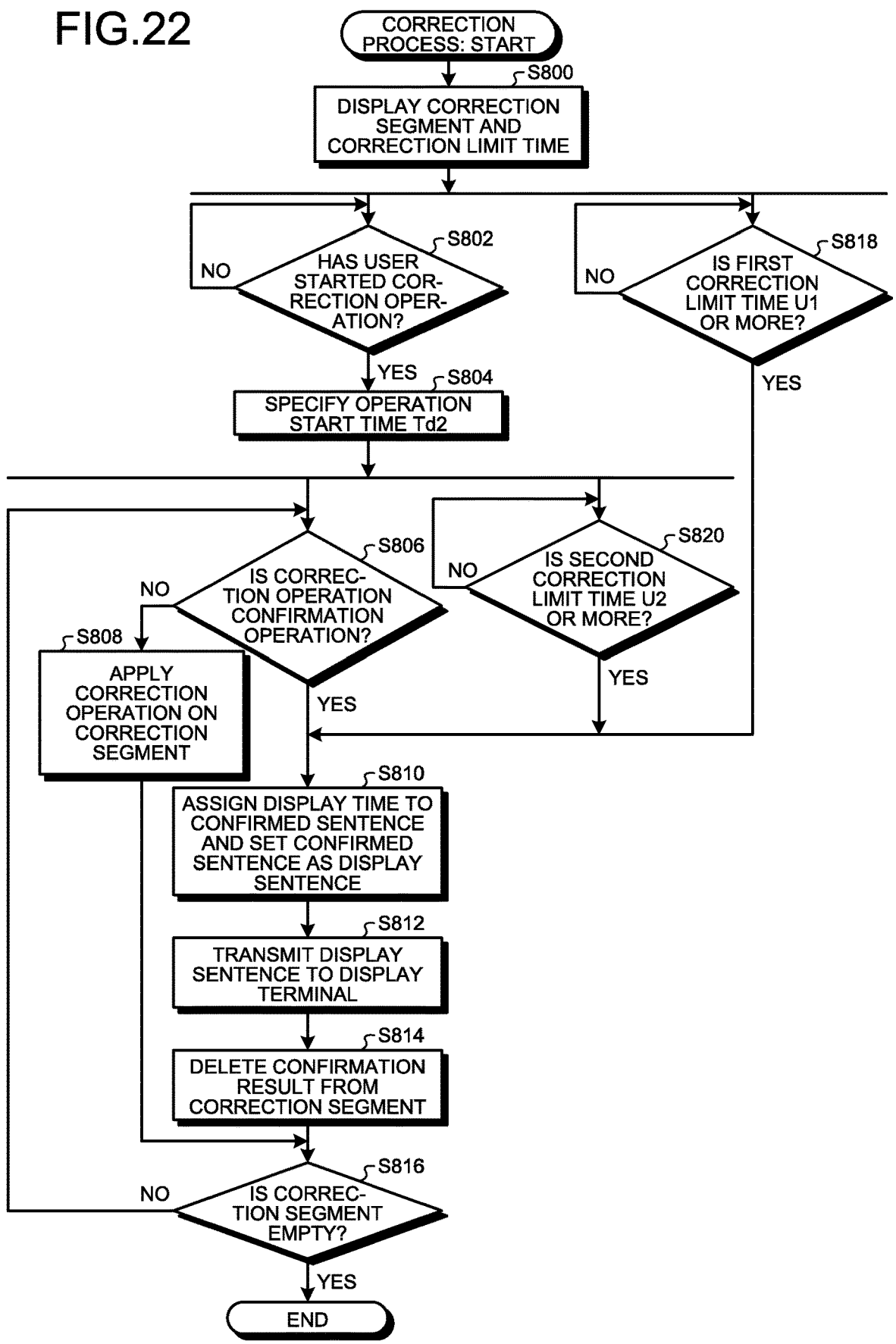
FIG. 22 is a flowchart of the sequence of a correction process.

FIG. 22 is a flowchart that illustrates an example of the sequence of the correction process.

First, the corrector 101C displays a correction screen 40 including a correction segment 32 and correction limit times on the UI unit 24 (Step S800). The corrector 20C maintains time when this correction segment 32 is displayed on the UI unit 24 as display start time Td1.

Next, the corrector 101C determines whether or not a user has started a correction operation for the displayed correction segment 32 (Step S802). For example, the corrector 101C performs the determination of Step S802 by determining whether or not any operation direction is performed for the correction screen 40 in accordance with a user's operation for the UI unit 24.

The corrector 101C repeats the determination of "No" (Step S802: No) until "Yes" is determined in Step S802 (Step S802: Yes). Then, when "Yes" is determined by the corrector 101C (Step S802: Yes), the process proceeds to Step S804.

In Step S804, the corrector 101C specifies time when "Yes" is determined in Step S802 as an operation start time Td2 when a correction operation is started (Step S804).

Then, the controller 101A, similarly to the process of Steps S708 to S718 illustrated in FIG. 21, performs the process of Steps S806 to S816.

In addition, the controller 101A performs the process of Step S818 in parallel with the process of Steps S802 to S816. In Step S818, the corrector 101C determines whether or not an elapsed time from the display start time Td1 when the correction segment 32 is displayed in Step S800 is the first correction limit time U1 or more (Step S818). The corrector 101C performs the determination of Step S818 by determining whether or not a difference between the display start time Td1 and the current time is the first correction limit time U1 or more.

The corrector 101C repeats the determination of "No" in Step S818 (Step S818: No) until "Yes" is determined in Step S818 (Step S818: Yes). Then, when "Yes" is determined in Step S818 (Step S818: Yes), the process proceeds to Step S810.

In addition, the controller 101A performs the process of Step S820 in parallel with the process of Steps S806 to S816. In Step S820, the corrector 101C determines whether or not an elapsed time from the operation start time Td2 specified in Step S804 is the second correction limit time U2 or more (Step S820). The corrector 101C performs the determination of Step S820 by determining whether or not a difference between the operation start time Td2 and the current time is the second correction limit time U2 or more.

The corrector 101C repeats the determination of "No" (Step S820: No) until "Yes" is determined in Step S820 (Step S820: Yes). Then, when "Yes" is determined in Step S820 (Step S820: Yes), the process proceeds to Step S810.

As described above, in the information processing apparatus 10F of this embodiment, a correction content at time when the correction time of the correction segment 32 becomes the correction limit time is used as a confirmed sentence 34 of the correction segment 32. In addition, in the information processing apparatus 10F, time when it is the correction limit time is used as confirmation time of the confirmed sentence 34.

For this reason, according to the information processing apparatus 10F of this embodiment, it can be suppressed that the display of a subtitle according to a confirmed sentence 34 corresponding to the correction segment 32 is delayed long due to a time required for the user's correction of the correction segment 32. In addition, it can be suppressed that the user's correction time of the correction segment 32 endlessly increases, and the subtitle of the confirmed sentence 34 can be displayed at display time according to the speech generation time of speech.

Therefore, according to the information processing apparatus 10F of this embodiment, also in a case where a time is required for a user's correction operation for the correction segment 32, the display of a subtitle more accurately reflecting the intention of the speaker can be provided in addition to the effects of the embodiment described above.

Modified Example 4

In the third embodiment described above, a case has been described in which an arbitrary value is set to the correction limit time in advance.

However, the corrector 101C may adjust the correction limit time in accordance with the length of the correction segment 32.

The length of the correction segment 32 is the number of characters or the number of morphemes included in the correction segment 32 or the time length of the correction segment 32.

More specifically, the corrector 101C sets a shorter correction limit time as the length of the correction segment 32 decreases. In other words, the corrector 101C sets a longer correction limit time as the length of the correction segment 32 increases.

For example, it is assumed that the number of characters included in the correction segment 32 is n. In this case, the corrector 101C may use a result of multiplication between n characters and a limit time per one character as the correction limit time of the correction segment 32. The limit time per one character may be set in advance.

In addition, it is assumed that the number of morphemes included in the correction segment 32 is m. In this case, the corrector 101C may use a result of multiplication between m and the limit time per one morpheme as the correction limit time of the correction segment 32. The limit time per one morpheme may be set in advance.

There are cases where one character forming a plurality of meanings is included in the correction segment 32. For example, there are cases where a Chinese character is included in the correction segment 32. In such cases, there are cases where an accurate correction limit time cannot be calculated when the number of characters or the number of morphemes is used as the length of the correction segment 32.

In such cases, it is preferable that the corrector 101C uses the time length of the correction segment 32 as the length of the correction segment 32.

The time length of the correction segment 32 is represented as a difference between start time corresponding a morpheme of earliest speech generation time included in the correction segment 32 and end time corresponding to a morpheme of latest speech generation time. In addition, as the time length of the correction segment 32, a sum value of time differences between start time and end time of morphemes included in the correction segment 32 may be used.

Then, the corrector 101C may calculate the correction limit time, for example, by using the following Equation (17)

$$U_i = U_1^t \times \Sigma_{k=1}^m \{(t_k^e - t_k^b) + U_2^t\} \tag{17}$$

In Equation (17), $U_i$ represents the correction limit time of the i-th correction segment 32; and $(t_k^e - t_k^b)$ represents a time difference between start time and end time of each of morphemes (morphemes of k=1 to m) included in the correction segment 32. In addition, in Equation (17), $U_1^t$ is a ratio of the correction limit time to the time length of the original speech of the correction segment 32 and has a value larger than "0"; and $U_2^t$ represents a time margin given to each morpheme. The parameters $U_1^t$ and $U_2^t$ may be set in advance.

More specifically, the correction limit time of the correction segment 32C illustrated in FIG. 3 is assumed to be calculated. Here, $U_1^t$ is "2", and $U_2^t$ is "100". In addition, the limit time per one character is "300", and the limit time per one morpheme is "600". In the correction segment 32C illustrated in FIG. 3, the number n of characters is "8", and the number m of morphemes is "2".

In this case, in a case where the number of characters included in the correction segment 32C is set as the length of the correction segment 32C, the correction limit time is "2400". In addition, in a case where the number of morphemes included in the correction segment 32C is set as the length of the correction segment 32C, the correction limit time is "1200". Furthermore, in a case where the time length of the correction segment 32C is set as the length of the correction segment 32C, the correction limit time is "2044".

Meanwhile, the correction limit time of the correction segment 32D illustrated in FIG. 3 is assumed to be calculated. Here, $U_1^t$ is "2", and $U_2^t$ is "100". In addition, the limit time per one character is "300", and the limit time per one morpheme is "600". In the correction segment 32D, the number n of characters is "21", the number m of morphemes is "11", and the time length is "8270".

In this case, in a case where the number of characters included in the correction segment 32D is set as the length of the correction segment 32D, the correction limit time is "6300". In addition, in a case where the number of morphemes included in the correction segment 32D is set as the length of the correction segment 32D, the correction limit time is "6600". Furthermore, in a case where the time length of the correction segment 32D is set as the length of the correction segment 32D, the correction limit time is "8270".

In this way, the corrector 101C may set a longer correction limit time as the length of the correction segment 32 increases.

Modified Example 5

The corrector 101C may adjust the correct limit time in accordance with the length of the correction segment 32 and the accuracy of speech recognition for the correction segment 32.

More specifically, the corrector 101C sets a shorter correction limit time as the certainty factor increases. The certainty factor represents the accuracy of speech recognition for the correction segment 32. As the certainty factor becomes higher, it represents that the speech recognition is more accurate.

In this modified example, the certainty factor is represented using a value in the range of "0" to "1". In this modified example, as the value of the certainty factor increases, it represents a higher certainty factor. More specifically, from a certainty factor "0" toward a certainty factor "1", the certainty factor becomes higher. To the contrary, as the value of the certainty factor becomes decreasing, it may represent a higher certainty factor.

However, the numerical range of the certainty factor is not limited to the range of "0" to "1". For example, the numerical range of the certainty factor may be "0" to "100".

In such a case, the acquirer 20A may acquire target sentence data 30 in which the certainty factor is assigned to each morpheme from the speech recognition terminal 12.

FIGS. 23A and 23B are schematic diagrams that illustrate examples of the data configuration of the target sentence data 30. The target sentence data 30 includes text data acquired through speech recognition by the speech recognition terminal 12 and speech generation time. The text data includes a plurality of morphemes. The speech generation time, for example, is represented by speech generation start time and speech generation end time.

In this modified example, the target sentence data 30 represents a certainty factor for each morpheme. In this modified example, the certainty factor is assigned by the speech recognition terminal 12.

The corrector 101C sets a shorter correction limit time to the correction segment 32 as the certainty factor increases. In addition, similarly to Modified Example 4 described above, the corrector 101C sets a shorter correction limit time to the correction segment 32 as the length of the correction segment 32 decreases.

For example, the corrector 101C calculates a correction limit time by using the following Equation (18). Equation (18) illustrates a case where the time length of the correction segment 32 is used as the length of the correction segment 32.

$$U_i = U_1^{ct} \times \Sigma_{k=1}^m \{(t_k^e - t_k^b) + (1 - c_k) + U_2^{ct}\} \quad (18)$$

In Equation (18), $U_i$ represents a correction limit time of the i-th correction segment 32; and $(t_k^e - t_k^b)$ represents a time difference between start time and end time of each of morphemes (morphemes of k=1 to m) included in the correction segment 32. In Equation (18), $U_1^{ct}$ is a ratio of the correction limit time to the time length of the original speech of the i-th correction segment 32 and has a value larger than "0"; and $U_2^{ct}$ represents a time margin given to each morpheme. The parameters $U_1^{ct}$ and $U_2^{ct}$ may be set in advance.

In Equation (18), $c_k$ represents the certainty factor of each of the morphemes (morphemes of k=1 to m) included in the i-th correction segment 32.

More specifically, it is assumed that the corrector 101C calculates the correction limit times of the correction segment 32C and the correction segment 32D illustrated in FIG. 23A. Here, $U_1^{ct}$ is set to "3", and $U_2^{ct}$ is set to "100".

In this case, by using Equation (18) described above, the corrector 101C calculates "986.4" as the correction limit time of the correction segment 32A'. Similarly, by using Equation (18) described above, the corrector 101C calculates "3894.3" as the correction limit time of the correction segment 32B'.

FIGS. 23A and 23B illustrate cases where morphemes are written in English as examples. However, the language of the morphemes is not limited to English.

In this way, the corrector 101C sets a shorter correction limit time to the correction segment 32 as the certainty factor increases, and the length of the correction segment 32 decreases.

In this way, the corrector 101C may adjust the correction limit time in accordance with the length of the correction segment 32 and the accuracy of speech recognition for the correction segment 32. By using this modified example, the corrector 101C can set a shorter correction limit time as the certainty factor increases, in other words, the necessity of correction of the correction segment 32 is lower. For this reason, in this modified example, the user's load at the time of performing a correction operation for the correction segment 32 can be decreased in addition to the effects of the embodiment described above.

Modified Example 6

The correction limit time may be adjusted based on the user's proficiency of correction for the correction segment 32, a user's correction speed, and the like.

For example, the information processing apparatus 10F stores user's identification information (user ID) and user's proficiency of correction and correction speed in association with each other in advance. Then, the display controller 101F may display a screen urging a user to input a user ID at the time of starting a user's operation for the UI unit 24 and receive a user ID.

Then, the corrector 101C may set a correction limit time in accordance with at least one of the user's proficiency of correction and the correction speed associated with the received user ID. For example, the corrector 101C may set a shorter correction limit time as the user's proficiency of correction increases, and the correction speed increases.

In addition, the corrector 101C may set the correction limit time in accordance with at least one of the length of the correction segment 32, the certainty factor, the user's proficiency of correction, and the user's correction speed.

Hardware Configuration

Figure 24:
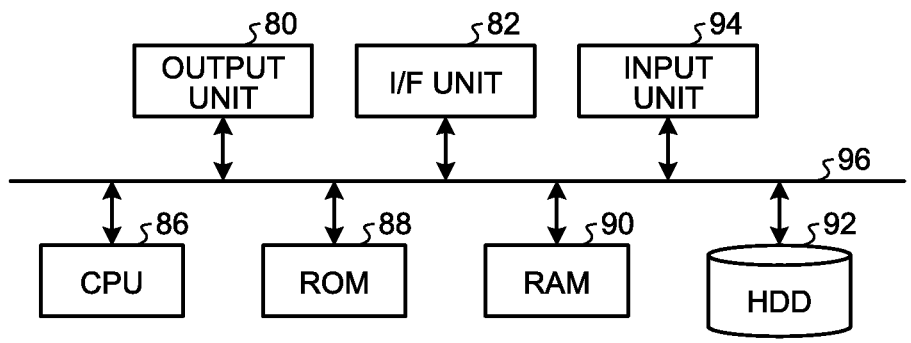
FIG. 24 is a block diagram that illustrates an example of the hardware configuration.

Next, the hardware configuration of the information processing apparatus 10, the information processing apparatus 10E, and the information processing apparatus 10F according to the embodiments and the modified examples described above will be described. FIG. 24 is a block diagram that illustrates an example of the hardware configuration of the information processing apparatus 10, the information processing apparatus 10E, and the information processing apparatus 10F according to the embodiments and the modified examples described above.

Each of the information processing apparatus 10, the information processing apparatus 10E, and the information processing apparatus 10F according to the embodiments and the modified examples described above has a configuration in which an output unit 80, an I/F unit 82, an input unit 94, a CPU 86, a read only memory (ROM) 88, a random access memory (RAM) 90, a HDD 92, and the like are interconnected through a bus 96 and has a hardware configuration using a general computer.

The CPU 86 is an arithmetic operation device that controls the process performed by each of the information processing apparatus 10, the information processing apparatus 10E, and the information processing apparatus 10F according to the embodiments and the modified examples described above. The RAM 90 stores data required for various processes performed by the CPU 86. The ROM 88 stores programs realizing various processes performed by the CPU 86 and the like. The HDD 92 stores data that is stored in the storage 22 described above. The I/F unit 82 is an interface used for transmitting/receiving data to/from other devices.

The output unit 80 and the input unit 94 correspond to the UI unit 24 described above and receive an operation direction from a user and perform display.

A program used for performing various processes described above performed by the information processing apparatus 10, the information processing apparatus 10E, and the information processing apparatus 10F according to the embodiments and the modified examples described above is provided with being embedded in the ROM 88 or the like in advance.

In addition, the program executed by the information processing apparatus 10, the information processing apparatus 10E, and the information processing apparatus 10F according to the embodiments and the modified examples described above may be configured to be provided with being recorded on a computer-readable recording medium, which may be provided as a computer program product, such as a CD-ROM, a flexible disk (FD), a CD-R, or a digital versatile disk (DVD) in a file of an installable form or an executable form for such apparatuses.

Furthermore, the program executed by the information processing apparatus 10, the information processing apparatus 10E, and the information processing apparatus 10F according to the embodiments and the modified examples described above may be configured to be stored on a computer connected to a network such as the Internet and be provided by being downloaded through the network. In addition, the program executing the processes described above in the information processing apparatus 10, the information processing apparatus 10E, and the information processing apparatus 10F according to the embodiments and the modified examples described above may be configured to be provided or distributed through a network such as the Internet.

In the program executing the various processes described above in the information processing apparatus 10, the information processing apparatus 10E, and the information processing apparatus 10F according to the embodiments and the modified examples described above, the units described above are configured to be generated on a main storage device.

In addition, various information stored in the HDD 92 described above may be stored in an external device. In such a case, the external device and the CPU 86 may be configured to be interconnected through a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   one or more hardware processors configured to:
   acquire, using speech recognition, target sentence data comprising a plurality of morphemes, and a speech generation time of each morpheme from the plurality of morphemes;
   determine a display time according to a difference between a confirmed sentence of which a user's correction for the target sentence data is confirmed and a second confirmed sentence of a previous speech generation time;
   assign the display time to the confirmed sentence; and
   output the confirmed sentence based on the display time to a display.

2. The apparatus according to claim 1, wherein the assigned display time is based at least in part on a difference between a speech generation start time of a first morpheme from the plurality of morphemes having an earliest speech generation time and a speech generation end time of a second morpheme having a latest speech generation time that are included in the second confirmed sentence.

3. The apparatus according to claim 1, wherein the one or more hardware processors are further configured to assign the display time to the confirmed sentence such that a difference between a confirmation time of the confirmed sentence and a display time of a subtitle of the confirmed sentence increases as the difference between the confirmed sentence and the second confirmed sentence increases.

4. The apparatus according to claim 1, wherein the one or more hardware processors are further configured to assign the display time to a connected confirmed sentence acquired by connecting the confirmed sentence to the second confirmed sentence when a connection score representing a degree of easiness in connecting the confirmed sentence and the second confirmed sentence as a sentence is a threshold or more.

5. The apparatus according to claim 1, wherein the one or more hardware processors are further configured to assign to the confirmed sentence the display time according to the difference between the confirmed sentence and the second confirmed sentence and a correction time for a correction segment.

6. The apparatus according to claim 5, wherein the one or more hardware processors are further configured to assign the display time having a decreasing difference from a confirmation time of the confirmed sentence to the confirmed sentence as the correction time increases.

7. The apparatus according to claim 5, wherein the one or more hardware processors are further configured to insert blank information representing a blank period when the blank period in which speech is not recognized is included in the correction segment.

8. The apparatus according to claim 3, wherein the one or more hardware processors are further configured to, when a correction time for a correction segment becomes a correction limit time, set a time when the correction limit time is reached as the confirmation time of the confirmed sentence corresponding to the correction segment.

9. The apparatus according to claim 1, wherein the one or more hardware processors are further configured to control the display to display a correction screen including a correction segment and a correction limit time of the correction segment.

10. The apparatus according to claim 9, wherein the correction limit time is set based at least in part on a length of the correction segment.

11. The apparatus according to claim 10, wherein the correction limit time decreases as the length of the correction segment decreases.

12. The apparatus according to claim 9, wherein the correction limit time decreases as a certainty factor representing accuracy of speech recognition for the correction segment increases.

13. The apparatus according to claim 9, wherein the correction limit time is set based at least in part on a correction proficiency of an amended of the correction segment and a correction speed of the amender.

14. An information processing method comprising:
    acquiring, using speech recognition, target sentence data comprising a plurality of morphemes and a speech generation time of each morpheme from the plurality of morphemes;
    determining a display time according to a difference between a confirmed sentence of which a user's correction for the target sentence data is confirmed and a second confirmed sentence of a previous speech generation time;
    assigning the displayed time to the confirmed sentence; and
    outputting the confirmed sentence based on the display time to a display.

15. A computer program product comprising a non-transitory computer-readable medium containing instructions which, when executed by a computer, cause the computer to perform:
    acquiring, using speech recognition, target sentence data comprising a plurality of morphemes and a speech generation time of each morpheme from the plurality of morphemes;
    determining a display time according to a difference between a confirmed sentence of which a user's correction for the target sentence data is confirmed and a second confirmed sentence of a previous speech generation time;
    assigning the displayed time to the confirmed sentence; and
    outputting the confirmed sentence based on the display time to a display.

* * * * *